(12) United States Patent
Ozguner et al.

(10) Patent No.: US 10,360,832 B2
(45) Date of Patent: Jul. 23, 2019

(54) POST-RENDERING IMAGE TRANSFORMATION USING PARALLEL IMAGE TRANSFORMATION PIPELINES

(71) Applicant: MICROSOFT TECHNOLOGY LICENSING, LLC, Redmond, WA (US)

(72) Inventors: Tolga Ozguner, Redmond, WA (US); Miguel Comparan, Kenmore, WA (US); Christopher Jon Johnson, Snoqualmie, WA (US); Jeffrey Powers Bradford, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 15 days.

(21) Appl. No.: 15/676,906

(22) Filed: Aug. 14, 2017

(65) Prior Publication Data

US 2019/0051229 A1 Feb. 14, 2019

(51) Int. Cl.
*G06T 1/20* (2006.01)
*G09G 3/20* (2006.01)
*G02B 27/01* (2006.01)

(52) U.S. Cl.
CPC ............. *G09G 3/2003* (2013.01); *G06T 1/20* (2013.01); *G02B 27/017* (2013.01); *G02B 2027/014* (2013.01); *G02B 2027/0112* (2013.01); *G09G 2310/0235* (2013.01); *G09G 2340/06* (2013.01); *G09G 2354/00* (2013.01)

(58) Field of Classification Search
CPC ......... G09G 3/2003; G09G 2310/0235; G09G 2340/06; G09G 2352/00; G06T 1/20; G06T 2210/52; G02B 27/017; G02B 2027/014
See application file for complete search history.

(56) References Cited

U.S. PATENT DOCUMENTS 5,109,348 A 4/1992 Pfeiffer et al.
5,684,498 A 11/1997 Welch et al.
(Continued)

FOREIGN PATENT DOCUMENTS

CN 102216941 A 10/2011
CN 102591449 A 7/2012
(Continued)

OTHER PUBLICATIONS

"Final Office Action Issued in U.S. Appl. No. 13/931,554", dated Jan. 7, 2016, 27 Pages.
(Continued)

*Primary Examiner* — Antonio A Caschera
(74) *Attorney, Agent, or Firm* — NovoTechIP International PLLC

(57) ABSTRACT

Techniques for post-rendering image transformation including outputting an image frame including a plurality of first pixels by sequentially generating and outputting multiple color component fields including a first color component field and a second color component field by applying one or more two-dimensional (2D) image transformations to at least one portion of the plurality of source pixels by first, second, and third image transformation pipelines, to generate transformed pixel color data for the first color component field and the second color component field.

20 Claims, 12 Drawing Sheets

(56) References Cited

U.S. PATENT DOCUMENTS

| | | | |
|---|---|---|---|
| 5,748,872 A | 5/1998 | Norman | |
| 5,945,972 A | 8/1999 | Okumura et al. | |
| 8,212,859 B2 | 7/2012 | Tang et al. | |
| 9,299,312 B2 | 3/2016 | Wyatt | |
| 9,443,355 B2 | 9/2016 | Chan et al. | |
| 9,659,410 B2 | 5/2017 | Hancock et al. | |
| 9,721,395 B2 | 8/2017 | Chan et al. | |
| 2002/0030649 A1 | 3/2002 | Lavracky et al. | |
| 2003/0132901 A1 | 7/2003 | Shimada | |
| 2003/0231191 A1 | 12/2003 | Glen | |
| 2004/0263502 A1 | 12/2004 | Dallas et al. | |
| 2006/0078215 A1 | 4/2006 | Gallagher | |
| 2006/0232665 A1 | 10/2006 | Schowengerdt et al. | |
| 2007/0273926 A1 | 11/2007 | Sugiyama et al. | |
| 2008/0297437 A1 | 12/2008 | Takahashi | |
| 2009/0102854 A1 | 4/2009 | Lai et al. | |
| 2009/0251526 A1 | 10/2009 | Book | |
| 2009/0315887 A1 | 12/2009 | Yamaguchi | |
| 2010/0002909 A1 | 1/2010 | Lefevre et al. | |
| 2010/0026714 A1 | 2/2010 | Utagawa | |
| 2010/0045701 A1 | 2/2010 | Scott et al. | |
| 2010/0283801 A1 | 11/2010 | Wu et al. | |
| 2011/0018903 A1 | 1/2011 | Lapstun et al. | |
| 2011/0046483 A1 | 2/2011 | Fuchs et al. | |
| 2011/0102473 A1 | 5/2011 | Chiou et al. | |
| 2012/0105473 A1 | 5/2012 | Bar-zeev et al. | |
| 2012/0154277 A1 | 6/2012 | Bar-zeev et al. | |
| 2012/0206452 A1 | 8/2012 | Geisner et al. | |
| 2012/0243732 A1 | 9/2012 | Swaminathan et al. | |
| 2012/0268490 A1 | 10/2012 | Sugden | |
| 2013/0083173 A1 | 4/2013 | Geisner et al. | |
| 2014/0184615 A1 | 7/2014 | Bergquist | |
| 2014/0285690 A1 | 9/2014 | Benedetti et al. | |
| 2015/0002542 A1 | 1/2015 | Chan et al. | |
| 2015/0029218 A1 | 1/2015 | Williams et al. | |
| 2015/0170418 A1 | 6/2015 | Flynn et al. | |
| 2015/0310665 A1 | 10/2015 | Michail et al. | |
| 2016/0238852 A1* | 8/2016 | Ellsworth | G02B 27/0179 |
| 2016/0335806 A1 | 11/2016 | Chan et al. | |
| 2018/0053284 A1* | 2/2018 | Rodriguez | G06T 5/006 |

FOREIGN PATENT DOCUMENTS

| | | |
|---|---|---|
| CN | 102640185 A | 8/2012 |
| WO | 2017147178 A1 | 8/2017 |

OTHER PUBLICATIONS

"Non-Final Office Action Issued in U.S. Appl. No. 13/931,554", dated Aug. 13, 2015, 23 Pages.

"Final Office Action Issued in U.S. Appl. No. 13/951,351", dated Oct. 14, 2015, 18 Pages.

"Non-Final Office Action Issued in U.S. Appl. No. 13/951,351", dated Mar. 28, 2016, 14 Pages.

"Non-Final Office Action Issued in U.S. Appl. No. 13/951,351", dated Apr. 7, 2015, 14 Pages.

"Office Action Issued in European Patent Application No. 14755447. 1", dated Aug. 16, 2018, 5 Pages.

"Office Action Issued in U.S. Appl. No. 15/227,453", dated Nov. 17, 2016, 21 Pages.

"Office Action Issued in Chinese Patent Application No. 201480037051. X", dated Jun. 2, 2017, 12 Pages.

"First Office Action and Search Report Issued in Chinese Patent Application No. 201480041966.8", dated Apr. 28, 2017, 18 Pages.

"Second Office Action Issued in Chinese Patent Application No. 201480041966.8", dated Jan. 22, 2018, 6 Pages.

Abrash, Michael, "Latency—the Sine Qua Non of AR and VR", Retrieved From: http://blogs.valvesoftware.com/abrash/latency-the-sine-qua-non-of-ar-and-vr/, Dec. 29, 2012, 77 Pages.

Azuma, et al., "Improving Static and Dynamic Registration in an Optical See-through HND", In Proceedings of the 21st Annual Conference on Computer Graphics and Interactive Techniques, Jul. 24, 1994, 17 Pages.

Bimber, Oliver, "Interactive Rendering for Projection-Based Augmented Reality Displays", In Doctoral dissertation, submitted in partial fulfillment of the requirements for the Degree of Doctor of philosophy in the department of Computer Science, University of North Carolina at Chapel Hill, Sep. 2, 2002, 214 Pages.

Burbidge, et al., "Hardware Improvements to The Helmet Mounted Projector", In Orlando Symposium, International Society for Optics and Photonics, Sep. 5, 1989, pp. 52-60.

Carmack, John, "Latency Mitigation Strategies", Retrieved From: https://danluu.com/latency-mitigation/, Feb. 22, 2013, 18 Pages.

Chow, et al., "Human Visual Perception of Region Warping Distortions", In Proceeding of 29th Australasian Computer Science Conference, vol. 48, Jan. 16, 2012, 10 Pages.

EVRYDAYVR, "Oculus Rift—How Does Time Warping Work?", Retrieved From: http://www.youtube.com/watch?v=WvtEXMIQQti, Apr. 19, 2014, 1 Page.

Gleue, et al., "Design and Implementation of a Mobile Device for Outdoor Augmented Reality in the Archeoguide Project", In Proceedings of the Conference on Virtual Reality, Archeology, and Cultural Heritage, Nov. 28, 2001, 8 Pages.

Hauswiesner, et al., "Multi-GPU Image-based Visual Hull Rendering", In Proceeding of Eurographics Symposium on Parallel Graphics and Visualization, May 13, 2012, 10 Pages.

Jacobs, et al., "Managing Latency in Complex Augmented Reality Systems", In Proceedings of the Symposium on Interactive 3D Graphics, Apr. 30, 1997, 6 Pages.

Kijima, et al., "A Development of Reflex HMD-HMD with Time Delay Compensation Capability", In Proceedings of International Symposium on Mixed Reality, Mar. 15, 2001, 8 Pages.

Mark, et al., "Post-Rendering 3D Image Warping: Visibility, Reconstruction, and Performance for Depth-Image Warping", In Dissertation submitted to the faculty of the university of North Carolina at Chapel Hill in partial fulfillment of the requirements for the Degree of Doctor of philosophy in the department of Computer Science, Apr. 21, 1999, 227 Pages.

Mark, et al., "Post-Rendering 3D Warping", In Proceedings of Symposium on Interactive 3D Graphics, Apr. 27, 1997, pp. 7-16.

Mine, et al., "Just-in-Time Pixels", In Technical Report—TR93-005, University of North Carolina at Chapel Hill, Mar. 1993, 5 Pages.

Olano, et al., "Combatting Rendering Latency", In Proceedings of Symposium on Interactive 3D Graphics and Games, Apr. 9, 1995, 7 Pages.

Pasman, et al., "Low Latency Rendering for Mobile Augmented Reality", In International Journal/Conference Paper of UbiCom-Project, Faculty of Information and Systems, Delft University of Technology, Jun. 1999, 7 Pages.

"International Search Report and Written Opinion Issued in PCT Application No. PCT/US18/038647", dated Sep. 14, 2018, 11 Pages.

"International Preliminary Report on Patentability Issued in PCT Application No. PCT/US2014/044386", dated Aug. 18, 2015, 9 Pages.

"International Search Report & Written Opinion Issued in PCT Application No. PCT/US2014/044386", dated Nov. 20, 2014, 12 Pages.

"Second Written Opinion Issued in PCT Application No. PCT/US2014/044386", dated May 8, 2015, 8 Pages.

"International Preliminary Report on Patentability Issued in PCT Application No. PCT/US2014/047714", dated Oct. 7, 2015, 9 Pages.

"International Search Report & Written Opinion Issued in PCT Application No. PCT/US2014/047714", dated Oct. 27, 2014, 12 Pages.

"PCT Demand for International Preliminary Examination in Application No. PCT/US2014/047714", Filed Date: Feb. 4, 2015, 20 Pages.

"Second Written Opinion Issued in PCT Application No. PCT/US2014/047714", dated Apr. 2, 2015, 9 Pages.

Regan, et al., "A Real-Time Low-Latency Hardware Light-Field Renderer", In Proceedings of the 26th Annual Conference on Computer Graphics and Interactive Techniques, Aug. 8, 1999, 4 Pages.

(56) References Cited

OTHER PUBLICATIONS

Regan, et al., "Priority Rendering with a Virtual Reality Address Recalculation Pipeline", In Proceedings of the SIGGRAPH 21st International ACM Conference on Computer Graphics and Interactive Techniques, Jul. 24, 2017, 8 Pages.
So, et al., "Compensating lags in Head-Coupled Displays using Head Position Prediction and Image Deflection", In Journal of Aircraft, vol. 29, Issue 6, Nov. 6, 1992, pp. 1064-1068.
Naveren, Van J.M.P., "The Asynchronous Time Wrap for Virtual Reality on Consumer Hardware", In Proceedings of the 22nd ACM Conference on Virtual Reality Software and Technology, Nov. 2, 2016, pp. 37-46.
Yanagida, et al., "Improvement of Temporal Quality of HMD for Rotational Motion", In IEEE 7th International Workshop on Robot and Human Communication, Oct. 1998, pp. 121-126.

* cited by examiner

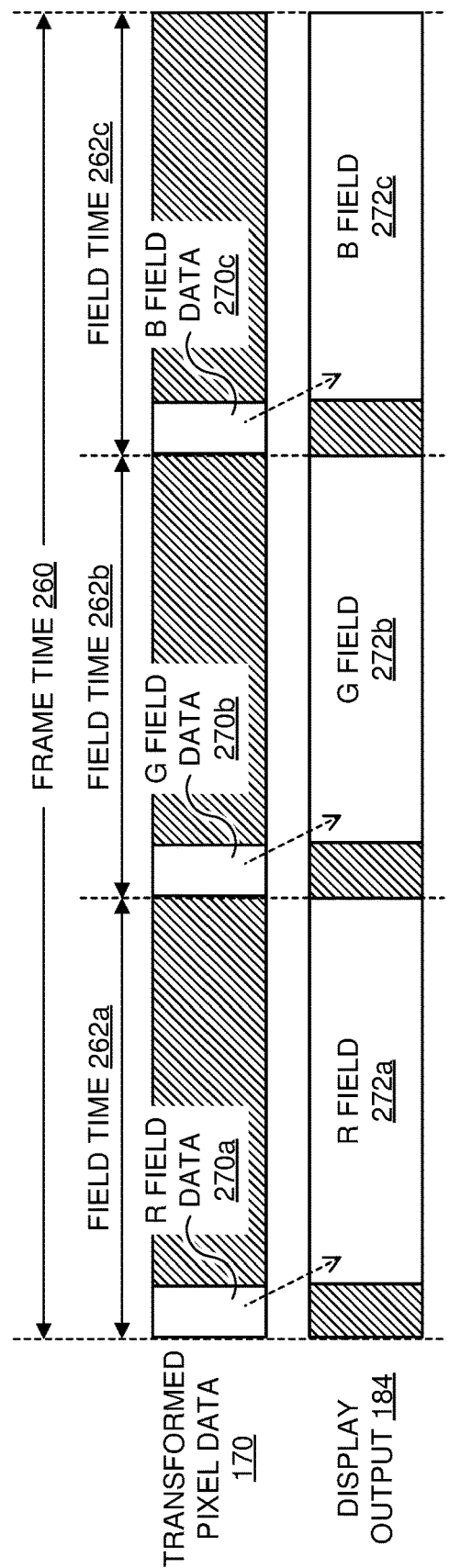

POST-RENDERING IMAGE TRANSFORMATION USING PARALLEL IMAGE TRANSFORMATION PIPELINES

BACKGROUND

Field sequential color (FSC) display devices output a sequence of single color component fields to display a full-color image frame. For example, an RGB FSC display may first display a red field to display a red component of the pixels of a displayed image, then display a green field to display a green component of the pixels, and then display a blue field to display a blue component of the pixels. The three fields are temporally integrated by the human visual system and observed as a full-color image, rather than the actual succession of red, blue, and green fields.

One approach to reducing visual latency between changes in conditions and displaying corresponding images is to perform a post-rendering transformation of a rendered image that is performed in a significantly reduced amount of time relative to the rendering of the rendered image. For example, an initial image may be rendered based on an early estimate of parameters, and a post-rendering transformation of the initial image may be performed based on a new, more accurate, estimate of the parameters performed shortly before the image is displayed. Latency may be further reduced, and energy demands reduced, by streaming transformed pixel data to a display device as it is being transformed. However, various post-rendering transformation approaches are not well suited for some FSC devices that receive color data in successive color fields. Solutions such as doing a separate full rendering for each color field using a CPU (central processing unit) or GPU (graphics processing unit) add an extra processing step, which increases both power consumption and latency, neither of which is desired. Solutions such as buffering a full RGB field for output as successive red, green, and blue fields require large output buffers increase latency and/or power consumption, neither of which is desired.

SUMMARY

Devices for post-rendering transformation are disclosed. The device can include a post-rendering image transformation module including multiple image transformation pipelines each arranged to generate transformed pixel color data for a single color component by applying one or more two-dimensional (2D) image transformations to a rendered source image, the image transformation pipelines including first, second, and third image transformation pipelines. The device may also include a source image data retrieval module arranged to retrieve pixel color values for the rendered source image in response to pixel color data requests received from the image transformation pipelines. In addition, the device can include control logic arranged to operate in a first configuration in which the post-rendering image transformation module is configured to output a first image frame including first pixels by sequentially generating and outputting multiple color component fields including a first color component field and a second color component field. In the device, each of the first pixels has pixel color values for at least a first color component and a second color component different than the first color component, the first color component field includes first pixel color values for the first color component for substantially all of the first pixels, substantially all pixel color values included in the first color component field specify an intensity value for the first color component, the generating the first color component field includes generating a first portion of the first pixel color values by the first image transformation pipeline, a second portion of the first pixel color values by the second image transformation pipeline, and a third portion of the first pixel color values by the third image transformation pipeline, the second color component field includes second pixel color values for the second color component for substantially all of the first pixels, substantially all pixel color values included in the second color component field specify an intensity value for the second color component, the generating the second color component field includes generating a first portion of the second pixel color values by the first image transformation pipeline, a second portion of the second pixel color values by the second image transformation pipeline, and a third portion of the second pixel color values by the third image transformation pipeline, and the first image transformation pipeline, the second image transformation pipeline, and the third image transformation pipeline are different pipelines.

In another aspect, methods for post-rendering image transformation are disclosed. The method may include determining a source image has been rendered, the rendered source image including source pixels, and outputting an image frame including a plurality of first pixels by sequentially generating and outputting multiple color component fields including a first color component field and a second color component field by applying one or more two-dimensional (2D) image transformations to at least one portion of the plurality of source pixels by first, second, and third image transformation pipelines, to generate transformed pixel color data for the first color component field and the second color component field. In the method, each of the first pixels has pixel color values for at least a first color component and a second color component different than the first color component, the first color component field includes first pixel color values for the first color component for substantially all of the first pixels, substantially all pixel color values included in the first color component field specify an intensity value for the first color component, the generating the transformed pixel color data for the first color component field includes generating a first portion of the first pixel color values by the first image transformation pipeline, a second portion of the first pixel color values by the second image transformation pipeline, and a third portion of the first pixel color values by the third image transformation pipeline, the second color component field includes second pixel color values for the second color component for substantially all of the first pixels, substantially all pixel color values included in the second color component field specify an intensity value for the second color component, the generating the transformed pixel color data for second color component field includes generating a first portion of the second pixel color values by the first image transformation pipeline, a second portion of the second pixel color values by the second image transformation pipeline, and a third portion of the second pixel color values by the third image transformation pipeline, and the first image transformation pipeline, the second image transformation pipeline, and the third image transformation pipeline are different pipelines.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2C illustrates another example of the post-transformation rendering module illustrated in FIG. 1 generating and outputting transformed pixel data as a sequence of color component fields, each specifying pixel color data for one color component, for a display device configured to receive all of a plurality of pixel color components for each update of its display output.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
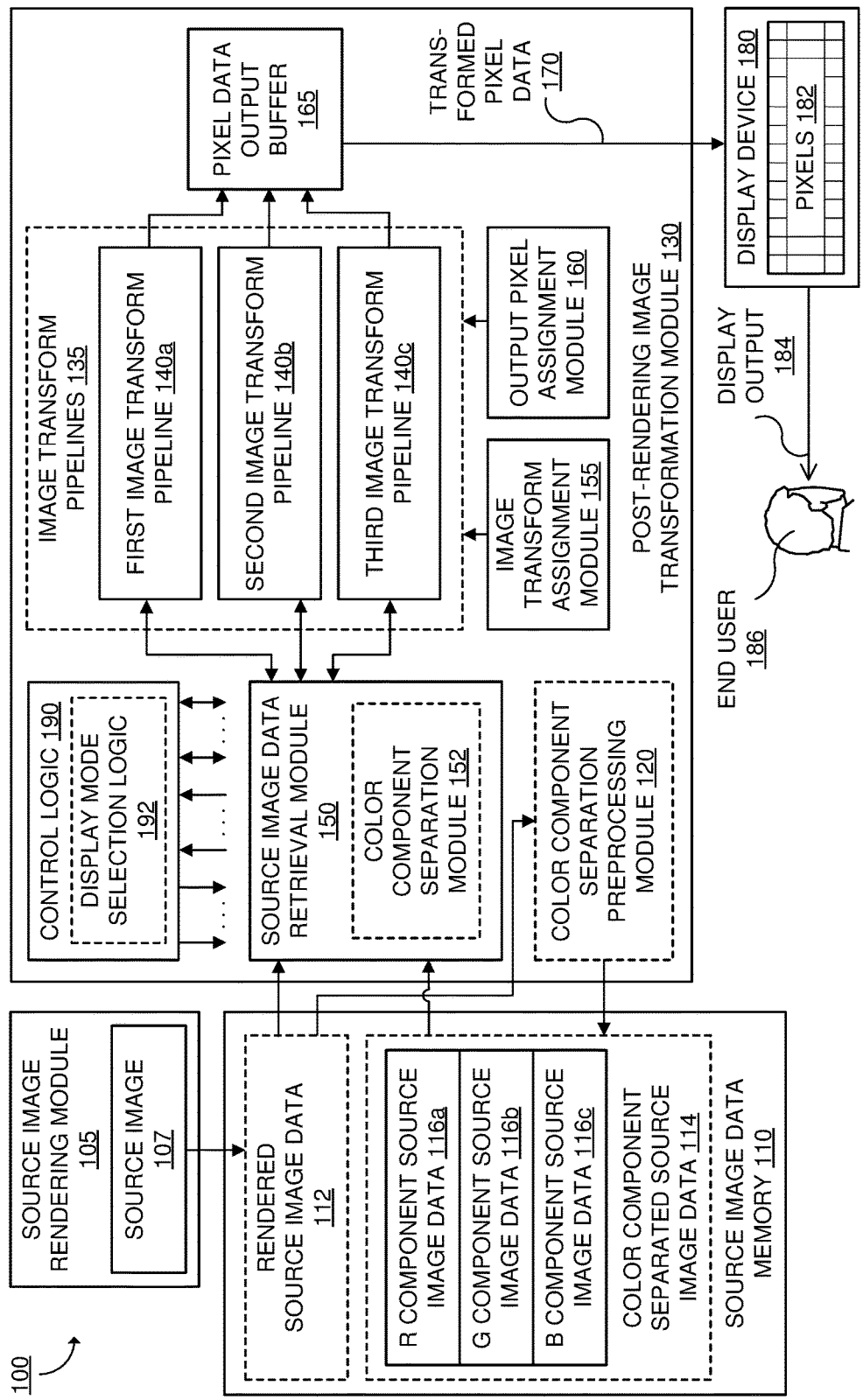
FIG. 1 is a schematic diagram illustrating features included in an example system arranged to reduce processing used for post-rendering transformation of a rendered source image for display via a display device.

FIG. 1 is a schematic diagram illustrating features included in an example system 100 arranged to reduce processing used for post-rendering transformation of a rendered source image for display via a display device 180. In some implementations, the system 100 may be implemented using one or more electronic devices. For example, an electronic device may include all of the features illustrated in FIG. 1. In some embodiments, source image rendering module 105, source image memory 110, and/or display device 180 may not be included in system 100.

In some implementations, the system 100 includes a source image rendering module 105 configured to render a source image 107. Source image 107 may be referred to as an "initial image," a "pre-transformation image," or a "fully rendered image." The rendered source image 107 is a 2D raster image, providing pixel color data values for multiple pixel locations within the source image 107. In some examples, the source image rendering module 105 may be configured to render the source image 107 based on a 3D model, which may provide, for example, information about one or more scenes, images, and/or objects. In some examples, source image rendering module 105 may implemented, in part or in whole, by a GPU. By performing complex 3D rendering with source image rendering module 105 and using the post-rendering transformation module 130 for later transformation, the resources of the source image rendering module 105 may be focused on 3D rendering activities. This can improve framerate and/or quality of the source image 107.

In some implementations, the system 100 includes a source image data memory 110 arrange to receive, store, and retrieve pixel color data for the source image 107 for later post-rendering image transformation. The stored pixel color data may be referred to as "source image data." Source image data memory 110 may be implemented using one or more DRAM devices (such as, but not limited to, DDR2, DDR3, DDR4, DDR5, GDDR5, or GDDR5×SDRAM), or may be implemented using non-DRAM volatile or nonvolatile memory devices (such as, but not limited to, 3D XPoint™, magnetoresistive RAM (MRAM), resistive RAM (RRAM), or static RAM (SRAM)). Although various examples described herein discuss transformation of a single source image to produce a transformed image, it is noted that multiple source images may be stored in the source image data memory, and multiple source images may be transformed to produce a single transformed image.

In some examples and/or configurations, pixel color data for a source image 107 may be stored in a portion of the source image data memory 110 as unseparated rendered source image data 112. The rendered source image data 112 may be stored as pixel data words that each encode multiple intensity values for respective color components. A color component may also be referred to as a "color plane," "primary color," "color channel," or "component channel." A pixel data word may be referred to as a "pixel word.". An arrangement of data for storing color component intensity values in a pixel data word (for example, which color components are included, their respective number formats and bitdepths, and their positions within a word) may be referred to as a "color encoding format," "color format" or "pixel color format." As one example, a first color encoding format may, using an 8-bit unsigned integer format, encode successive red, green, and blue values in a packed 24-bit pixel data word (which is an example of the OpenGL GL_RGB8UI color format), which in rendered source image data 112 may be stored as aligned (for example, 4 bytes aligned, with a new 24-bit pixel data word every 4 bytes) or unaligned (with a new pixel data word every 3 bytes). It is noted that different color formats, bitdepths for color components, and/or number formats (such as integer or floating-point) may be used for various operations performed by the system 100. In a hypothetical example, source image 107 is rendered in RGBA with 8 bits per color component, source image data 112 is stored as unaligned pixel data words in the above first color encoding format (discarding alpha channel data), transformations are performed with 16 bits per color component, and pixel color values may be provided to a display in the above first color encoding format but with a different order for the color components. In some examples, the rendered source image data 112 may be stored as compressed image data encoding pixel color data for multiple color components, reducing memory bandwidth and size demands. Such compressed image data can be later retrieved and decompressed to obtain the pixel color data as pixel data words each encoding multiple color components.

In some examples and/or configurations, pixel color data for a source image 107 may be stored in a portion of the source image data memory 110 as color component separated source image data 114. For each different color component used by display 180 to physically display pixels, the color component separated source image data 114 includes a respective color component source image data storing a respective intensity value for the color component for each pixel of the source image 107. As discussed in more detail below, separation of pixel color data for source image 107 according to displayed color components can substantially reduce memory read bandwidth in some configurations. In the example illustrated in FIG. 1, the source image 107 rendered has been separated into three color components, respectively stored in the color component separated source image data 114 as R component source image data 116a ("R" being a first color component, such as, but not limited to, a red color component), G component source image data 116b ("G" representing a second color component, such as, but not limited to, a green color component), and B component source image data 116c ("B" representing a third color component, such as, but not limited to, a blue color component). The component source image data 116a, 116b, and 116c are stored separate from each other, such as in separate regions of the source image data memory 110. In the color component source image data 116a, 116b, and 116c pixel color data for the source image 107 is stored as successive intensity values " . . . RRRRRRRR . . . " (for data 116a), " . . . GGGGGGGG . . . " (for data 116b), " . . . BBBBBBBB . . . " (for data 116c). In some examples, each color component source image data is a contiguous block of data. In some examples, each color component included in the color component separated source image data 114 is stored as compressed image data for a single color component. For example, R component source image data 116a would be stored as first compressed image data encoding pixel color data for the first color component, G component source image data 116b would be stored as second compressed image data encoding pixel color data for the second color component, and B component source image data 116c would be stored as third compressed image data encoding pixel color data for the third color component. By compressing each color component separately, the compressed image data corresponding to a desired color component may be retrieved separately in later operations, allowing use of compressed image data (reducing memory bandwidth and size) while also avoiding wasted memory bandwidth retrieving data for color components that are not currently desired.

The source image rendering module 105 generates source image 107 with pixel data described as intensity values for a first plurality of color components. For example, source image 107 may be an RGB image describing pixel data as intensities of red, green, and blue color components. System 100 outputs pixel color data to display 180 using a second plurality of color components different from each other. For example, an FSC display device using a red, green, blue, green color component sequence uses only three different color components: red, green, and blue color components. An FSC display device may also be referred to as a color separated (CS) display device. Where, as with the above examples in this paragraph, the first and second pluralities of color components are the same, color component separated source image data 114 may be generated by a simple decomposition, demultiplexing, or de-interlacing of pixel data words provided for source image 107. However, in some examples or configurations the first and second pluralities of color components are different, such as with an FSC display device with 4 color channels (for example, RGBW (red, green, blue, white) or RGBY (red, green, blue, yellow)), 5 color channels (for example, RGBYC (red, green, blue, yellow, cyan)), or 6 color channels (for example, RGBCMY (red, blue, green, cyan, magenta, yellow) or RGBCYW), and a conversion is performed to describe pixels in the source image 107 using the second plurality of color components.

In some implementations, the system 100 may include a color component separation preprocessing module 120, which is arranged to receive pixel data for the source image 107 and store corresponding pixel color data as color component separated source image data 114. In some examples, the color component separation preprocessing module 120 is configured to retrieve the pixel data for the source image 107 from rendered source image data 112 in source image data memory 110. In some examples, the source image rendering module 105 is configured to provide source image 107 directly to the color component separation preprocessing module 120, which avoids a write and read of rendered source image data 112 in source image data memory 110, reducing memory bandwidth and contention. In some implementations or configurations, instead of using the color component separation preprocessing module 120, the source image rendering module 105 may be configured to store the pixel color data for the source image 107 as color component separated source image data 114. As discussed above, in some examples, the color component separated source image data 114 is stored as compressed image data for each color component. In such examples, the source image 107 (which may be compressed or uncompressed image data) is separated by color component separation preprocessing module 120 into its component colors, and pixel color data for each color component is stored as a respective compressed image data encoding pixel color data for a single color component.

System 100 includes a post-rendering image transformation module 130, which is arranged to generate transformed pixel data by applying one or more two-dimensional (2D) image transformations to source image pixel data stored in source image memory 110. In this disclosure, a "transformation" may also be described as a "transform" (as done in the label "post-rendering image transformation module 130" in FIG. 1).

An image transformation maps pre-transformation positions in a source space (for example, a coordinate system applicable to source image 107) and corresponding post-transformation positions in a destination space (for example, a coordinate system applicable to output pixel locations for display 180). An image transformation may include a sequence, concatenation, or other combination of image transformations. By combining multiple image transformations, a more complex transformation can be defined that more accurately realizes a transformation directed to one goal (for example, complex asymmetric optical distortions). By combining multiple image transformations, multiple goals can be realized (for example, correction for optical distortion and transformation of source image 107 to account for detected movement) using respective transformations. Some examples of individual 2D image transformations include two-dimensional geometric image transformations such as, but are not limited to, affine transformations (linear conformal (scaling, translations, rotations) and shears), projective transformations (projections, homographies, and collineations), and piecewise linear transformations (for example, affine transformations applied separately to triangular regions of an image); nonlinear image transformations such as, but not limited to, polynomial transformations, nonuniform scaling, circular or radial distortion (barrel, pincushion, moustache, and multiorder), and tangential distortion (for example, using Brown's model). In some implementations, different image transformations directed to correcting chromatic aberration may be applied for each display color component. Transformations or portions of transformations may be implemented using various techniques, such as, but not limited to, matrix operations, numerical approximation (such as Taylor series or Newton-Raphson), and mapping/interpolation.

The post-rendering image transformation module 130 includes a plurality of image transformation pipelines 135 each arranged to generate transformed pixel intensity data values for a single color component (which may be referred to as "pixel color values," "pixel color component values," or "pixel color component intensity values") by applying one or more 2D image transformations to rendered source image data. In this disclosure, an image transformation pipeline may be referred to as a "pixel processing pipeline," or more simply as a "pipeline." The image transformation pipelines 135 are each arranged to generate a transformed pixel color data value for an output pixel by identifying, according to one or more image transformations applied by the pipeline for the output pixel, one or more pixels included in a source image; obtaining pixel color data, for the color component being processed by the pipeline, for the identified source image pixels; and generating the transformed pixel color data value based on the obtained pixel color data. Each of the image transformation pipelines 135 may include a set of data processing elements that operate in series to generate a transformed pixel color data value for an output pixel, and two or more of the set of data processing elements may concurrently operate on different output pixels. In the example illustrated in FIG. 1, the plurality of image transformation pipelines 135 has three image pipelines: a first image transformation pipeline 140*a*, a second image transformation pipeline 140*b*, and a third image transformation pipeline 140*c*, although the plurality of image transformation pipelines 135 may include more than three image transformation pipelines. Although the examples illustrated in this application include image transformation pipelines 135 that each generate pixel color data for one output pixel at a time, in other implementations the image transformation pipelines 135 may be arranged to generate pixel color intensity data for blocks of multiple pixels at a time. For example, the first image transformation pipeline 140*a* may be arranged to output quads (2×2 groups of pixels), 1×n pixel strips, or tiles or blocks (m×n blocks of pixels, rectangular or square).

The post-rendering image transformation module 130 and/or system 100 includes a source image data retrieval module 150, which is arranged to receive pixel color data requests from the image transform pipelines 135, retrieve corresponding portions of the source image data memory 110 as needed to fulfill the received requests, and provide the requested pixel color data in response to the received requests. In some examples or configurations, source image data retrieval module 150 is configured to retrieve pixel color data from rendered source image data 112. In examples in which the rendered source image data 112 or color component separated source image data 114 is stored as compressed image data, source image data retrieval module 150 is configured to, in response to receiving a pixel color data request from a pipeline, retrieve a portion of a stored compressed image data corresponding to the received pixel color data request from source image data memory 110, decompress the retrieved portion of compressed image data to obtain pixel color data (which, in a case where the image data is not separated by color component, may be in pixel data words each encoding intensity values for multiple color components). The source image data retrieval module 150 may include a color component separation module 152 that is arranged to obtain pixel color values for different color channels from pixel words retrieved from source image data memory 110. In examples including color component separation module 152 and in which the rendered source image data 112 is a multiple color component image stored as compressed image data, color component separation module 152 separates decompressed pixel words into pixel color data for different color components. In an example in which source image 107 is stored as color component separated source image data 114 and display device 180 is a field-based FSC display, use of color component separation module 152 is not required, as the source image 107 has already been divided into separate color components stored as component source image data 116*a*, 116*b*, and 116*c*.

In some implementations, the post-rendering image transformation module 130 includes an image transformation assignment module 155 arranged to assign image transformations to the image transformation pipelines 135. An assigned image transformation may be determined based on at least a component color to be operated on by a target image transformation pipeline. In some implementations, the post-rendering image transformation module 130 includes an output pixel assignment module 160 that is arranged to assign output pixels to be worked on by each of the plurality of image transformation pipelines 135. In some examples, the output pixel assignment module 160 also indicates an order in which the assigned output pixels are processed, so as to generate pixel data in an order suitable for streaming the transformed pixel data 170 to the display device 180. For example, the indicated order may cause the plurality of image transform pipelines 135 to process output pixel locations beginning at a topmost row of output pixels and working down, row by row, to a bottommost row. In some examples, rather than being a separate module, the output pixel assignment module 160 may be incorporated into the pipelines.

The post-rendering image transformation module 130 includes a pixel data output buffer 165 configured to receive transformed pixel color data values generated by the image transformation pipelines 135, briefly store the received pixel color data values, and output the received pixel color values in an arrangement and according to a protocol suitable for output as transformed pixel data 170. The pixel data output buffer 165 may simply be referred to as a "buffer" (such as "buffer 165").

As noted above, the system 100 may include a display device 180 arranged to receive the transformed pixel data 170, and physically generate a visual display output 184 for pixels 182 displaying the transformed pixel data 170. In the particular example illustrated in FIG. 1, system 100 further includes circuitry (not illustrated separately in FIG. 1) arranged to provide transformed pixel data 170 to display device 180 according to signaling requirements. Post-rendering transformation module 130 or display device 180 may include a display controller (not illustrated separately in FIG. 1) arranged to perform signaling used to display the transformed pixel data 170. The pixels 182 are arranged in rows and columns with respective output pixel locations. Display output 184 may be observed by an end user 186 of the system 100. In some examples, the display device 180 may be concurrently viewed by multiple end users 186, with shared and/or independent display out for each end user 186.

The post-rendering image transformation module 130 includes control logic 190, which is arranged to coordinate and control operations of various elements included in system 100, including configuration of the post-rendering image transformation module 130. In some implementations, the post-rendering image transformation module 130 or system 100 is arranged to operate according to a first configuration (which may be referred to as a "first display mode," and in the particular example illustrated in FIG. 1 may also be referred to as "RGB mode") that concurrently generates transformed pixel color data for multiple color components. The first configuration may be suitable where display device 180 is arranged to concurrently display the multiple color components of a frame. In other implementations, the post-rendering image transformation module 130 or system 100 is arranged to operate according to a second configuration (which may be referred to as a "second display mode," and in the particular example illustrated in FIG. 1 may also be referred to as "FSC mode" or "CS mode") that generates transformed pixel color data for an image frame including pixels as a sequence of color component fields, each color component field for a single color component, including pixel color values for the color component for substantially all of the pixels, and with substantially all pixel color values included in the color component field specifying an intensity value for the color component. The second configuration may be suitable where display device 180 is a field sequential color display device, such as a field sequential color display device configured to receive pixel color data for one color component field at a time. Although for purposes of reference these configurations are referred to as first and second configurations (or first and second display modes), in some embodiments the above first configuration may be referred to as a "second configuration" (or "second display mode") and the above second configuration may be referred to as a "first configuration" (or "first display mode").

In other implementations, the post-rendering image transformation module 130 or system 100 is arranged to selectively operate according to either of the first and second configurations discussed in the previous paragraph (although different types of display device would be used for the first and second configurations). In such implementations, the control logic 190 is arranged to receive a display mode selection indicating the first display mode or the second display mode, and includes display mode selection logic 192 arranged to cause the control logic 190 to selectively operate in the first or second configuration in response to the received display mode selection. In response to the display mode selection indicating the first display mode, the control logic 190 configures the post-transformation rendering module 130 to operate according to the first configuration, and may also configure other elements of system 100 to operate according to the first configuration. In response to the display mode selection indicating the second display mode, the control logic 190 configures the post-transformation rendering module 130 to operate according to the second configuration, and may also configure other elements of system 100 to operate according to the second configuration. Such implementations, allowing selective operation according to either of the first and second configurations, offers display type independence for post-rendering image transformation module 130, allowing for other business or implementation considerations to drive a decision on a device type (for example, a frame-based RGB display or a field-based FSC display).

In some implementations, post-rendering transformation module 130 is implemented within a single system-on-a-chip (SoC). In such implementations, some or all of source image rendering module 105, rendered source image data memory 112, and/or color component separated source image memory 114 may also be implemented within the single SoC.

Figure 2A:
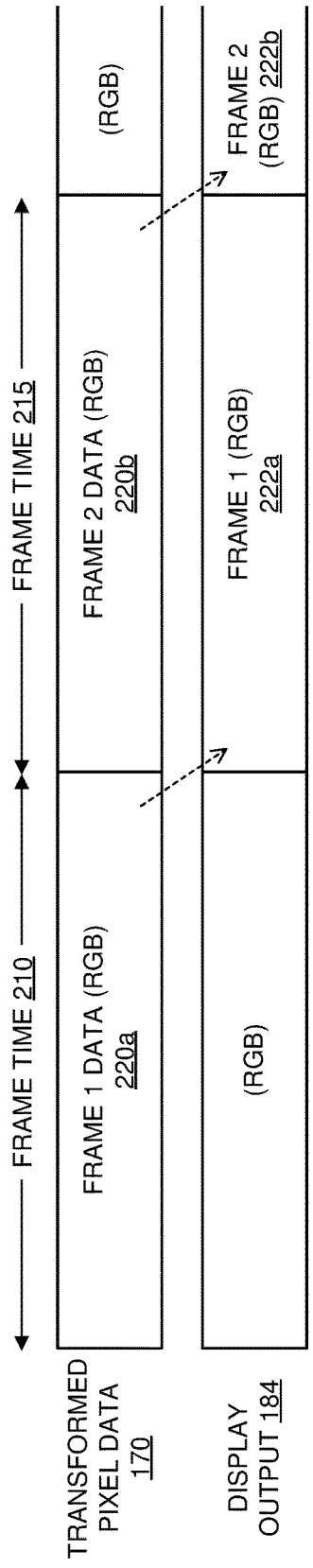
FIG. 2A illustrates an example of the post-transformation rendering module illustrated in FIG. 1 generating and outputting transformed pixel data for a display device configured to receive all of a plurality of pixel color components for each update of its display output.

FIG. 2A illustrates an example of the post-transformation rendering module 130 illustrated in FIG. 1 generating and outputting transformed pixel data 170 for a display device 180 configured to receive all of a plurality of pixel color components for each update of its display output 184. Such display devices may be referred to as being "frame-driven." Except where conflicting with the below discussion, the descriptions in FIG. 1 apply to the configuration illustrated in FIG. 4. In some examples, transformed pixel data 170 may be provided as a stream of multiple pixel words, with each pixel word specifying all of the color intensity values to be displayed by a respective pixel 182 included in display device 180 during a frame time. In some examples, transformed pixel data 170 may be provided as pixel color intensity data for groups of multiple pixels. For example, pixel color intensity data for a group of pixels may be encoded in a message, which may include other data such as, but not limited to, header data, parity data, a checksum, and/or an error correction code.

Figure 8:
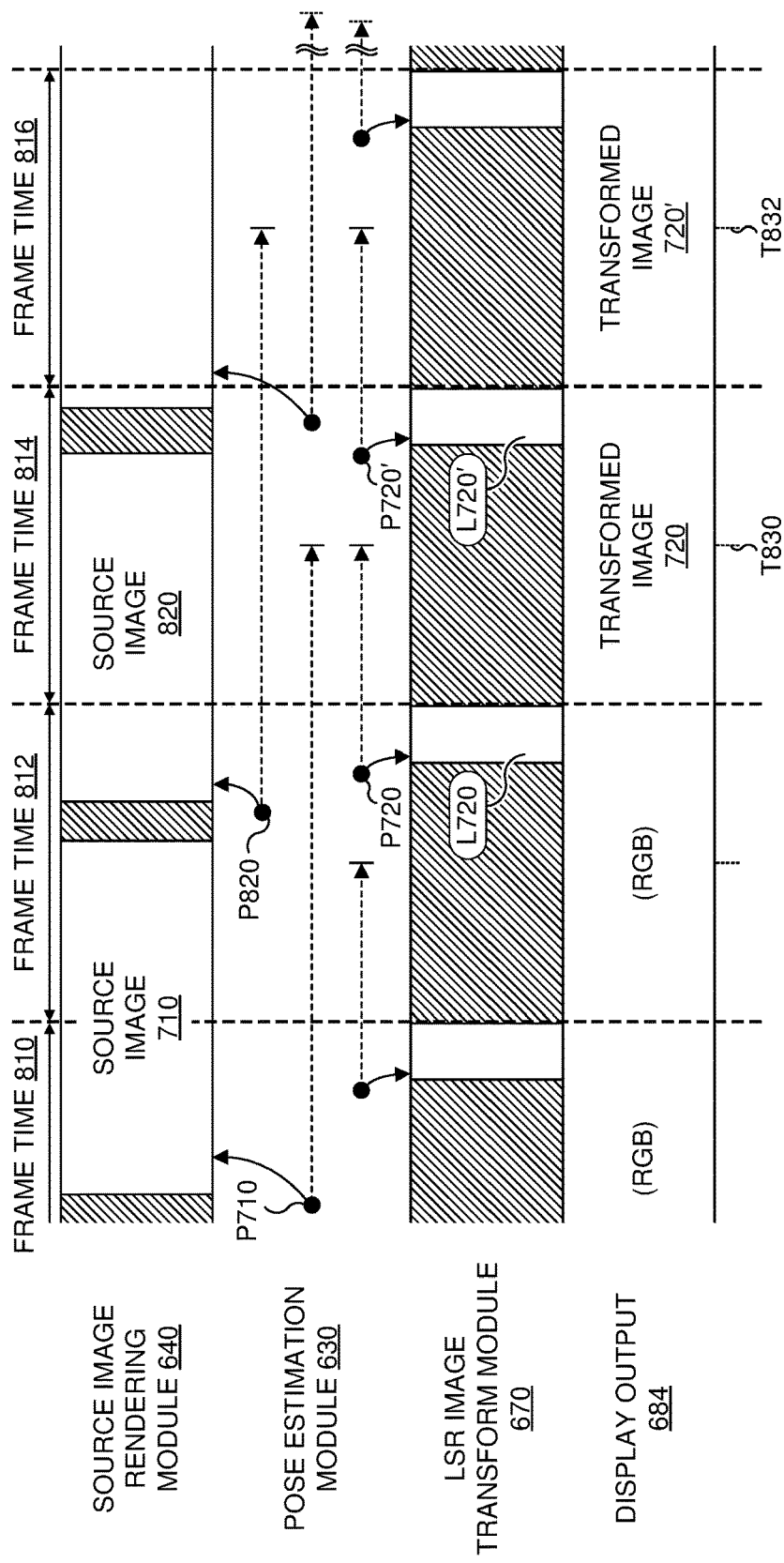

In the example illustrated in FIG. 2A, during a first frame time 210, the post-transformation rendering module 130 generates transformed pixel data 220a for all of the color components for a first frame ("frame 1"), and provides the transformed pixel data 220a for the first frame to the display device 180. Also during the first frame time 210, the display output 184 displays a frame ("frame 0") that immediately precedes the first frame. During a second frame time 215, the post-transformation rendering module 130 generates transformed pixel data 220b for all of the color components for a second frame ("frame 2") immediately following the first frame, and provides the transformed pixel data 220b for the second frame to the display device 180. Also during the second frame time 215, the display output 184 displays a first frame 222a corresponding to the transformed pixel data 220a received during the previous frame time 210. During the subsequent frame time, the display output 184 displays a second frame 222b corresponding to the transformed pixel data 222 received during the previous frame time 215. This pattern, in which pixel data provided to display device 180 during one frame time is displayed during a following frame time, continues for subsequent frames. A duration of a frame time corresponds to a rate at which the display device 180 displays new image frames; for example, if a refresh rate of display device 180 is 100 Hz, the duration of frame times 210 and 220 are each 10 milliseconds. It is noted that generation and delivery of transformed pixel data for a frame may be performed in substantially less than a frame time, as is illustrated in the example of FIG. 8 discussed below.

Figure 2B:
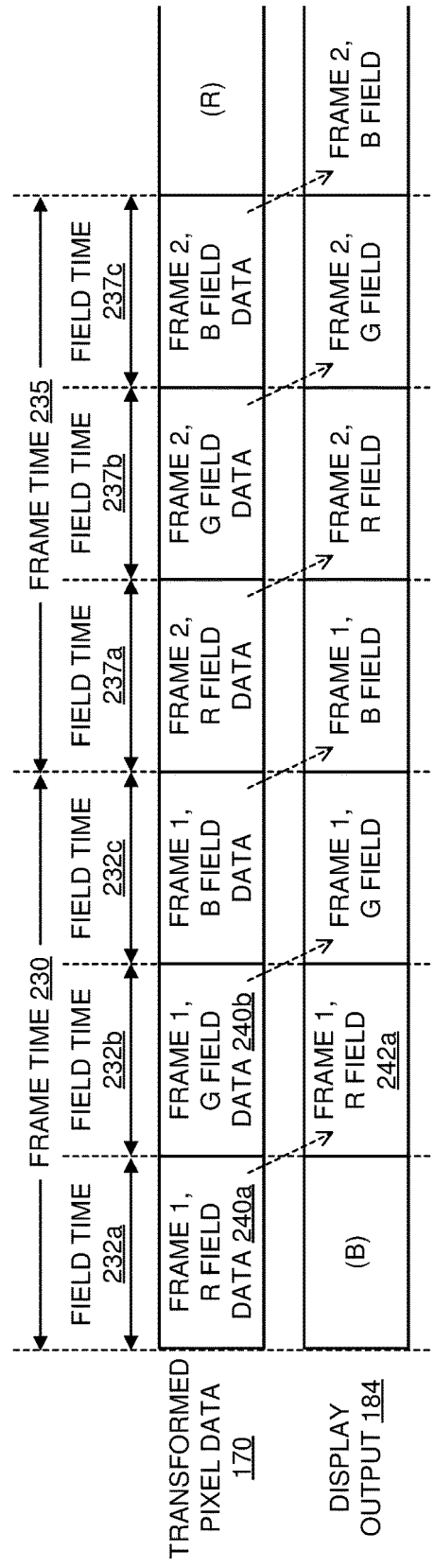
FIG. 2B illustrates an example of the post-transformation rendering module illustrated in FIG. 1 generating and outputting transformed pixel data as a sequence of color component fields, each specifying pixel color data for one color component.
Figure 10:
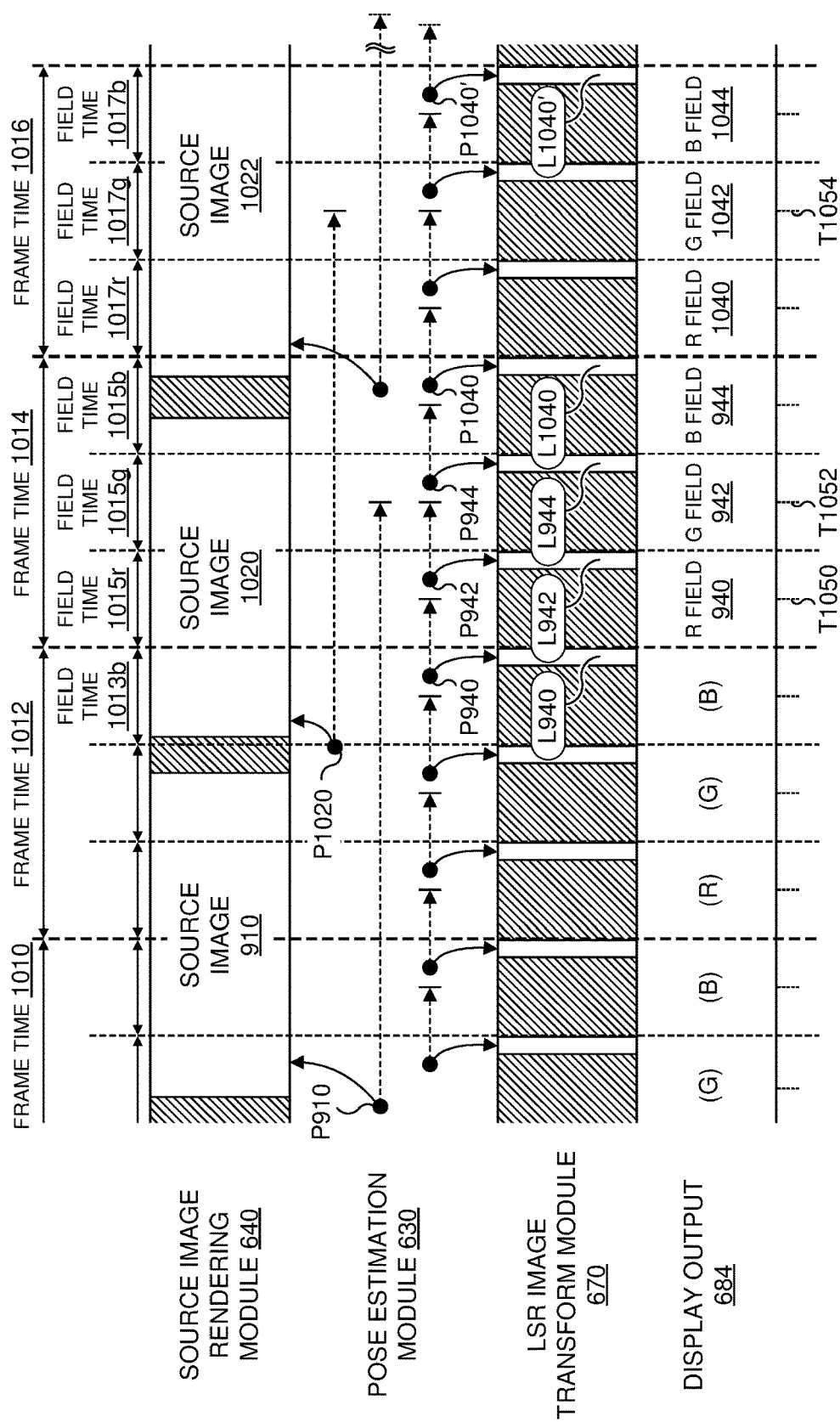

FIG. 2B illustrates an example of the post-transformation rendering module 130 illustrated in FIG. 1 generating and outputting transformed pixel data 170 as a sequence of color component fields, each specifying pixel color data for one color component. Display devices configured to receive such pixel data may be referred to as being "field-driven," and may include field sequential color display devices. Except where conflicting with the below discussion, the descriptions in FIG. 1 apply to the configuration illustrated in FIG. 2B. As in FIG. 2A, two field times (field times 230 and 235) are illustrated in FIG. 2B. Each of the field times is divided into multiple field times; for example, frame time 230 includes field times 232a, 232b, and 232c, and frame time 235 includes field times 237a, 237b, and 237c. During the first field time 232a, the post-transformation rendering module 130 generates transformed pixel color data 240a for an R component field of a first frame ("frame 1"), and provides the transformed pixel color data 240a to the display device 180. Also during the first field time 232a, the display output 184 displays a B component field for a frame ("frame 0") that immediately precedes the first frame. During the second field time 232b, the post-transformation rendering module 130 generates transformed pixel color data 240b for a B component field of the first frame, and provides the transformed pixel color data 240b to the display device 180. Also during the second field time 232b, the display output 184 displays the R component field 242a for the first frame, beginning display output for the first frame. This pattern, in which pixel color data provided to display device 180 during one field time is displayed during a following field time, continues for subsequent fields. It is noted that generation and delivery of transformed pixel color data for a field may be performed in substantially less than a field time, as is illustrated in the example of FIG. 10.

FIG. 2C illustrates another example of the post-transformation rendering module 130 illustrated in FIG. 1 generating and outputting transformed pixel data 170 as a sequence of color component fields, each specifying pixel color data for one color component, for a display device 180 configured to receive all of a plurality of pixel color components for each update of its display output 184. However, in this example, pixel color data for each color component field are both generated and displayed within the same field times. Except where conflicting with the below discussion, the descriptions in FIGS. 1 and 2B apply to the configuration illustrated in FIG. 4. A frame time 260 includes three field times 262a, 262b, and 262c. During the field time 262a, the post-transformation rendering module 130 generates transformed pixel color data 270a for an R component field 272a and provides the transformed pixel color data 270a to the display device 180, and the display output 184 displays R component field 272a during a remaining portion of the field time 262a. For the same field, transformed pixel color data 270b for a G component field 272b and transformed pixel color data 270c for a B component field 272c are similarly generated, provided, and displayed. The periods between the display of fields may be used for changing a backlight from one color component to the next in the sequence used by the display device 180. In some examples, a similar approach may be used to modify the example illustrated in FIG. 2A, such as by during a first portion of a frame time (such as frame time 215) the post-transformation rendering module 130 outputs pixel data for a frame, and during a remaining portion of the same frame time the frame is displayed.

Figure 3A:
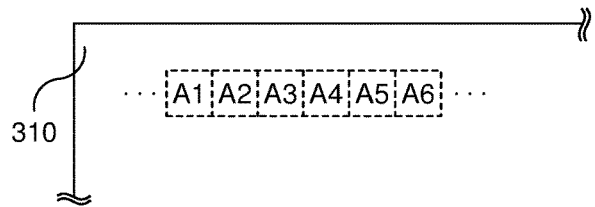
FIG. 3A illustrates an example of an output image and six pixel locations for the output image.
Figure 3B:
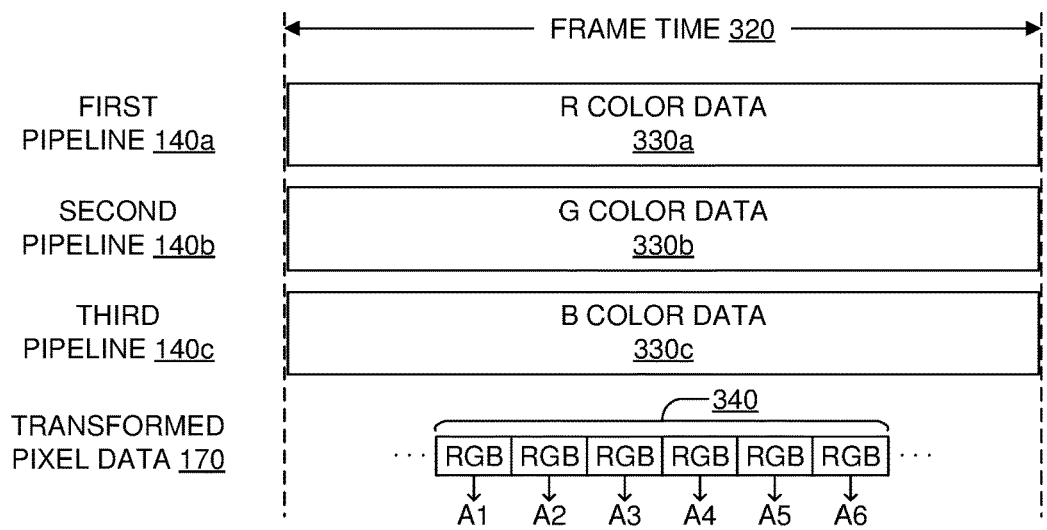
FIG. 3B illustrates an example of the post-transformation rendering module illustrated in FIG. 1 operating in accordance with the example illustrated in FIG. 2A.

FIG. 3A illustrates an example of an output image 310 and six pixel locations A1-A6 for the output image 310. The six illustrated pixel locations A1-A6 are located together in a single row and form a contiguous set of neighboring pixel locations. FIG. 3B illustrates an example of the post-transformation rendering module 130 illustrated in FIG. 1 operating in accordance with the example illustrated in FIG. 2A. In this example, post-rendering transformation module 130 is configured to, during a frame time 320 and concurrently, use the first image transformation pipeline 140a (labeled "first pipeline 140a") to generate the transformed R component pixel color data 330a (labeled "R color data") output for a frame, use the second image transformation pipeline 140b to generate the transformed G component pixel color data 330b output for the frame, and use the third image transformation pipeline 140c to generate the transformed B component pixel color data 330c output for a frame. During the frame time 320 (for example, between successive updates of the display output 184), transformed pixel color data is generated by the plurality of image transformation pipelines 135 for each of a first plurality of color components used by the display device 180 (for example, red, green, and blue for an RGB LCD display device with a red subpixel, a green subpixel, and a blue subpixel for each pixel 182) for each of the pixels 182 used to display the frame. In some examples, during substantially all of the generation of the transformed pixel color data 330a, 330b, and 330c, the plurality of image transformation pipelines 135 are concurrently operating to generate color components for all of the first plurality of color components. In some examples, as illustrated by the example shown in FIG. 3B, there are multiple pixel pipelines processing a given RGB output image in parallel, and each image transform pipeline is processing a different color component.

In some implementations including at least twice as many image transformation pipelines 135 as the number of color components in the first plurality of color components, each color component data 330a, 330b, and 330c is generated using a respective disjoint plural subset of the plurality of image transformation pipelines 135. In such implementations, the output pixel assignment module 160 divides the output pixels among the plural image transformation pipelines used to process each color component.

The transformed color component data values generated by the plurality of image transformation pipelines 135 are received by the buffer 165, which is configured to briefly store a small fraction of the transformed color component data 330a, 330b, and 330c for the frame, and output the received pixel color values in an arrangement and according to a protocol suitable for being provided to the display device 180. FIG. 3B illustrates an arrangement 340 of the color component data values output by the buffer 165 for the pixel locations A1-A6, in which the R, G, and B color component values generated for a pixel location (or values based thereon) are each included in a respective pixel data word (for example, a packed 24-bit pixel data word including an 8-bit intensity value for each of the R, G, and B color components) for the pixel location.

Generation of the transformed pixel color data 330*a*, 330*b*, and 330*c* by the pipelines 140*a*, 140*b*, and 140*c* does not necessarily require the entire frame time 320, as illustrated below in FIG. 8. Additionally, similar to the example illustrated in FIG. 2C for generating pixel data for fields, transformed pixel data may be both generated and displayed within a single time frame.

Figure 3C:
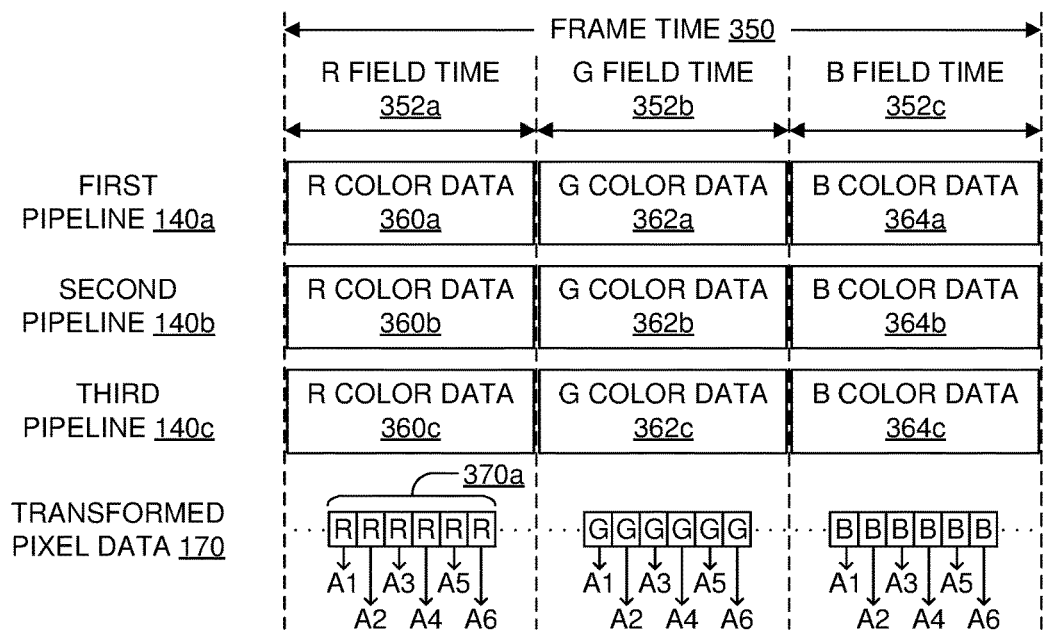
FIG. 3C illustrates an example of the post-transformation rendering module illustrated in FIG. 1 operating in accordance with the example illustrated in FIG. 2B.

FIG. 3C illustrates an example of the post-transformation rendering module 130 illustrated in FIG. 1 operating in accordance with the example illustrated in FIG. 2B. In this example, a frame time 350 includes an R component field time 352*a* (labeled "R field time 352*a*"), a G component field time 352*b*, and a B field time 352*c*. During the R component field time 352*a*, the post-rendering transformation module 130 is configured to output the transformed R component pixel color data for a transformed R component field by generating a first transformed R component pixel color data portion 360*a* (for a first portion of the R component field) by the first image transformation pipeline 140*a*, generating a second transformed R component pixel color data portion 360*b* (for a second portion of the R component field) by the second image transformation pipeline 140*b*, and generating a third transformed R component pixel color data portion 360*c* (for a third portion of the R component field) by the third image transformation pipeline 140*c*. Substantially all of the transformed R component pixel color data generated during frame time 350 is generated by the plurality of image transformation pipelines 135 during the R component field time 352*a* (for example, between successive updates of the display output 184). The output pixel assignment module 160 is configured to assign a first subset of pixel locations (for the first portion of the R component field) to the first image transformation pipeline 140*a*, a second subset of pixel locations (for the second portion of the R component field) to the second image transformation pipeline 140*b*, and a third subset of pixel locations (for the third portion of the R component field) to the third image transformation pipeline 140*c*. In some examples, approximately a same number of pixel locations are assigned to each of the plurality of image transformation pipelines 135 used to generate the transformed R component field. In some examples, additional image transformation pipelines may be used to generate respective transformed R component pixel color data portions.

During the R component field time 352*a*, the transformed R component pixel color data values generated by the plurality of image transformation pipelines 135 are received by the buffer 165, which is configured to briefly store a small fraction of the transformed R component pixel color data for the R component field, and output the received R component pixel color data values in an arrangement and according to a protocol suitable for being provided to the display device 180. FIG. 3C illustrates an example arrangement 370*a* of R component pixel color data values output by the buffer 165 for the pixel locations A1-A6, in which R component pixel color data values for successive locations are output in succession.

During the G component field time 352*b*, the post-rendering transformation module 130 is configured to output the transformed G component pixel color data for a transformed G component field in much the same way, with the image transformation pipelines 140*a*, 140*b*, and 140*c* generating transformed G component pixel color data for respective transformed G component pixel color data portions 362*a*, 362*b*, and 362*c*. Substantially all of the transformed G component pixel color data generated during frame time 350 is generated by the plurality of image transformation pipelines 135 during the G component field time 352*b* (for example, between successive updates of the display output 184). As with the R component field time 352*a*, during the G component field time 352*b* the buffer 165 outputs transformed G component pixel color data values in an arrangement and according to a protocol suitable for being provided to the display device 180 (for example, the same arrangement and protocol used for the transformed R component pixel color data values).

During the B component field time 352*c*, the post-rendering transformation module 130 is configured to output the transformed B component pixel color data for a transformed B color component field in much the same way, with the image transformation pipelines 140*a*, 140*b*, and 140*c* generating transformed B component pixel color data for respective transformed B component pixel color data portions 364*a*, 364*b*, and 364*c*. Substantially all of the transformed B component pixel color data generated during frame time 350 is generated by the plurality of image transformation pipelines 135 during the B component field time 352*c* (for example, between successive updates of the display output 184). As with the R component field time 352*a*, during the B component field time 352*c* the buffer 165 outputs transformed B component pixel color data values in an arrangement and according to a protocol suitable for being provided to the display device 180 (for example, the same arrangement and protocol used for the transformed R component data values).

Generation of transformed pixel color data for a color component, such as the R component pixel color data 360*a*, 360*b*, and 360*c*, by the pipelines 140*a*, 140*b*, and 140*c* does not necessarily require an entire field time (such as R component field time 352*a*), as illustrated in FIGS. 2C and 10. Additionally, as illustrated in FIG. 2C, transformed pixel color data may be both generated and displayed within a single time frame.

Figure 4:
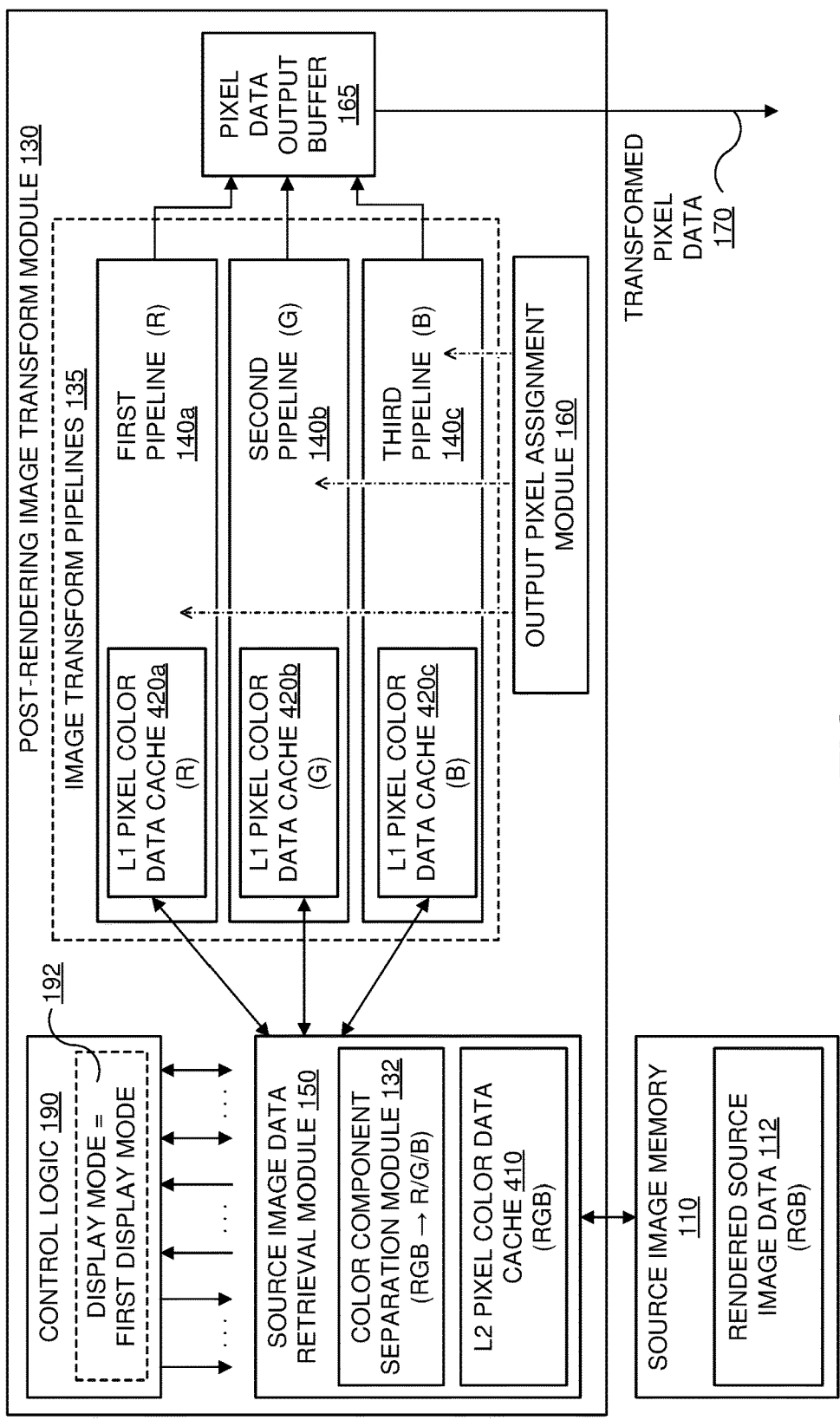
FIG. 4 illustrates an example of the post-rendering transformation module illustrated in FIG. 1 operating in a configuration generating and outputting transformed pixel data for a display device configured to receive all of a plurality of pixel color components for each update of its display output.

FIG. 4 illustrates an example of the post-rendering transformation module 130 illustrated in FIG. 1 operating in a configuration generating and outputting transformed pixel data 170 for a display device 180 configured to receive all of a plurality of pixel color components for each update of its display output 184. The configuration illustrated in FIG. 4 corresponds to the first configuration and first display mode described in FIG. 1. Except where conflicting with the below discussion, the descriptions in FIGS. 1, 2A and 3B apply to the configuration illustrated in FIG. 4. In an implementation in which the post-rendering image transformation module 130 is arranged to selectively operate according to either of the first and second configurations described in FIG. 1, the control logic 190, in response to the display mode selection indicating the first display mode, configures the post-transformation rendering module 130 to operate as illustrated in FIG. 4.

In the configuration illustrated in FIG. 4, it is assumed that pixel data for a source image (for example, source image 107 rendered by source image rendering module 105) that is to be transformed to generate the transformed pixel data 170 is stored in source image data memory 112 included in source image memory 110. In response to pixel color data requests received from the plurality of image transformation pipelines 135, the source image data retrieval module 150 provides requested pixel color component data, retrieving corresponding portions of the source image data memory 112 as needed to fulfill requests. In some implementations, as illustrated in FIG. 4, the source image data retrieval module 150 includes a pixel color data cache 410 (labeled "L2 pixel color data cache 410" to reflect the presence of pixel color data caches in the plurality of image transform pipelines 135) arranged to cache pixel color data retrieved from source image data memory 112. As each of the plurality of image processing pipelines 135 is arranged to operate on monochrome pixel color data for a single color component, the source image data retrieval module 150 provides monochrome pixel color data for a single color component. The source image data retrieval module 150 uses color component separation module 132 to extract and/or separate pixel color intensity data for individual color components from pixel data retrieved from source image data memory 112 (which contains pixel color data for multiple color components, which may be multiplexed in pixel data words).

As in the example illustrated in FIG. 3B, the post-rendering image transformation module 130 is configured to generate transformed R component data using the first image transformation pipeline 140a, to generate transformed G component data using the second image transformation pipeline 140b, and to generate transformed B component data using the third image transformation pipeline 140c. In the configuration illustrated in FIG. 4, the image transformation pipelines 140a, 140b, and 140c each include a respective pixel color data cache 420a, 420b, and 420c (labeled as "L1 pixel color data caches"), which are arranged to cache pixel color data provided to a pipeline by source image data retrieval module 150. In an example in which multiple image transformation pipelines are being used to generate transformed pixel color data for a single color component, the post-rendering image transformation module 130 may include one or more pixel color data caches that are shared by multiple image transformation pipelines. In the configuration illustrated in FIG. 4, the output pixel assignment module 160 may be configured to, for each frame output by the post-rendering image transformation module 130, assign all of the pixel locations in the frame to each of the three image transformation pipelines 140a, 140b, and 140c.

Figure 5:
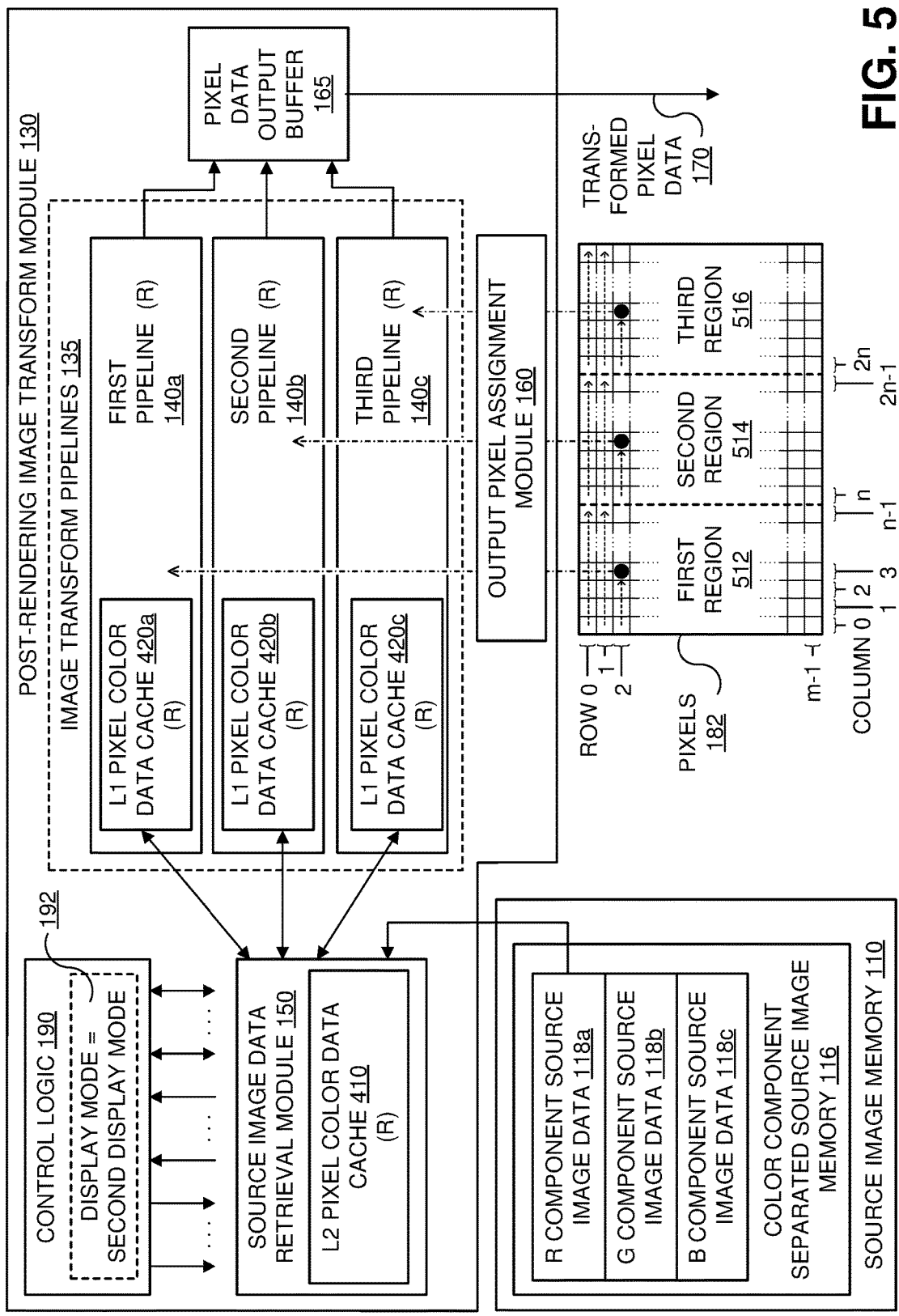
FIG. 5 illustrates an example of the post-rendering transformation module illustrated in FIG. 1 operating in a configuration generating and outputting transformed pixel data as a sequence of color component fields, each specifying pixel color data for one color component.

FIG. 5 illustrates an example of the post-rendering transformation module 130 illustrated in FIG. 1 operating in a configuration generating and outputting transformed pixel data 170 as a sequence of color component fields, each specifying pixel color data for one color component. The configuration illustrated in FIG. 5 corresponds to the second configuration and second display mode described in FIG. 1. Except where conflicting with the below discussion, the descriptions in FIGS. 1, 2B, 2C, and 3B apply to the configuration illustrated in FIG. 5. Details and elements described in FIG. 4, where not conflicting with the below discussion, may apply to the configuration illustrated in FIG. 5 (such as, but not limited to, use of pixel color data caches 420a-420c by the image transformation pipelines 135). In an implementation in which the post-rendering image transformation module 130 is arranged to selectively operate according to either of the first and second configurations described in FIG. 1, the control logic 190, in response to the display mode selection indicating the second display mode, configures the post-transformation rendering module 130 to operate as illustrated in FIG. 5. FIG. 5 illustrates operation of the post-rendering image transform module 130 to output transformed R component field pixel data 510, similar to the operations described in FIG. 3C during R component field time 352a. It is understood that similar operations are performed to output the remaining fields for the field (for example, a G component field and a B component field, much as illustrated in FIGS. 2B, 2C, and 3C).

In the configuration illustrated in FIG. 5, it is assumed that pixel color component data for a source image (for example, a source image 107 rendered by source image rendering module 105) that is to be transformed to generate the transformed pixel data 170 is stored as color component separated source image data 114 in source image memory 110 as a plurality of color component source image data (such as R component source image data 116a, G component source image data 116b, and B component source image data 116c), as may be done using color component separation preprocessing module 120. Much as described in FIGS. 1 and 4, source image data retrieval module 150 services pixel data requests received from the plurality of image transform pipelines 135. However, in this example in which the source image 107 has been stored as color component separated source image data 114, the source image data retrieval module 150 is configured to retrieve pixel color data from the appropriate portion of the color component separated memory 114 (in this case, the R component source image data 116a). By this configuration, memory read bandwidth between source image memory 110 and the post-rendering image transform module 130 is more efficient, as only pixel color data for a color component currently being processed by the plurality of image transform pipelines 135 is retrieved. In the specific example illustrated in FIG. 5, in which the source image has been separated into three color components, an amount of data read from source image memory 110 to output a field may be reduced to ⅓ (versus a source image data memory 112 using an RGB packed pixel data word format) or ¼ (versus an RGBA format). Additionally, in an implementation including pixel data cache 410, the pixel data cache 410 can store data for a much greater number of pixel locations, potentially increasing cache hit rates and reducing amounts of repeated reads from portions of source image memory 110. It is noted that in some implementations the pixel color data may instead be stored, retrieved, and processed much as illustrated in FIG. 4, in which the source image pixel data has not been color separated. Although this results in wasting memory read bandwidth to retrieve pixel color data for currently unused color components, the pixel data cache 410 may be configured to store only pixel color data for a color component currently being processed, thereby realizing a similar improvement in cache performance.

As described for R component field time 352a in FIG. 3C, the post-rendering image transformation module 130 is configured to generate transformed pixel color data for a current color component using the plurality of image transformation pipelines 135; in FIG. 5, all three of the pipelines 140a, 140b, and 140c are configured to generate transformed R component pixel color data. In the configuration illustrated in FIG. 5, the output pixel assignment module 160 may be configured to, for each field output by the post-rendering image transformation module 130, divide the pixel locations in the field among the image transformation pipelines 135 being used. In some examples, the pixels 182 are divided into regions, each region consisting of contiguous groups of columns. Approximately a same number of columns may be included in each region. FIG. 5 illustrates an example in which pixels 182 consist of m rows of pixel locations and approximately 3 xn columns of pixel locations, with the pixels 182 divided into three regions: a first region 512 consisting of the pixel locations in columns 0 through n−1 and assigned to the first pipeline 140a; a second region 514 consisting of the pixel locations in columns n through 2n−1 and assigned to the second pipeline 140b; and a third region 516 consisting of the remaining pixel locations, beginning with column 2n, and assigned to the third pipeline 140c. Also, in FIG. 5, pixel locations for a field are processed beginning with first row 0, and proceeding through successive rows to the last row m−1. The buffer 165 may be configured to buffer transformed pixel color values as they are generated for a row, and then output completed rows in succession as transformed pixel data 170. FIG. 5 illustrates a time during generating the R component field at which image transformation pipelines 135 have generated transformed R component pixel color data for all of rows 0 and 1, the transformed R component pixel color data for rows 0 and 1 has been output by the buffer 165, and the image transformation pipelines 135 have each generated three transformed R component pixel color data values for row 2, which are stored in buffer 165.

Figure 6:
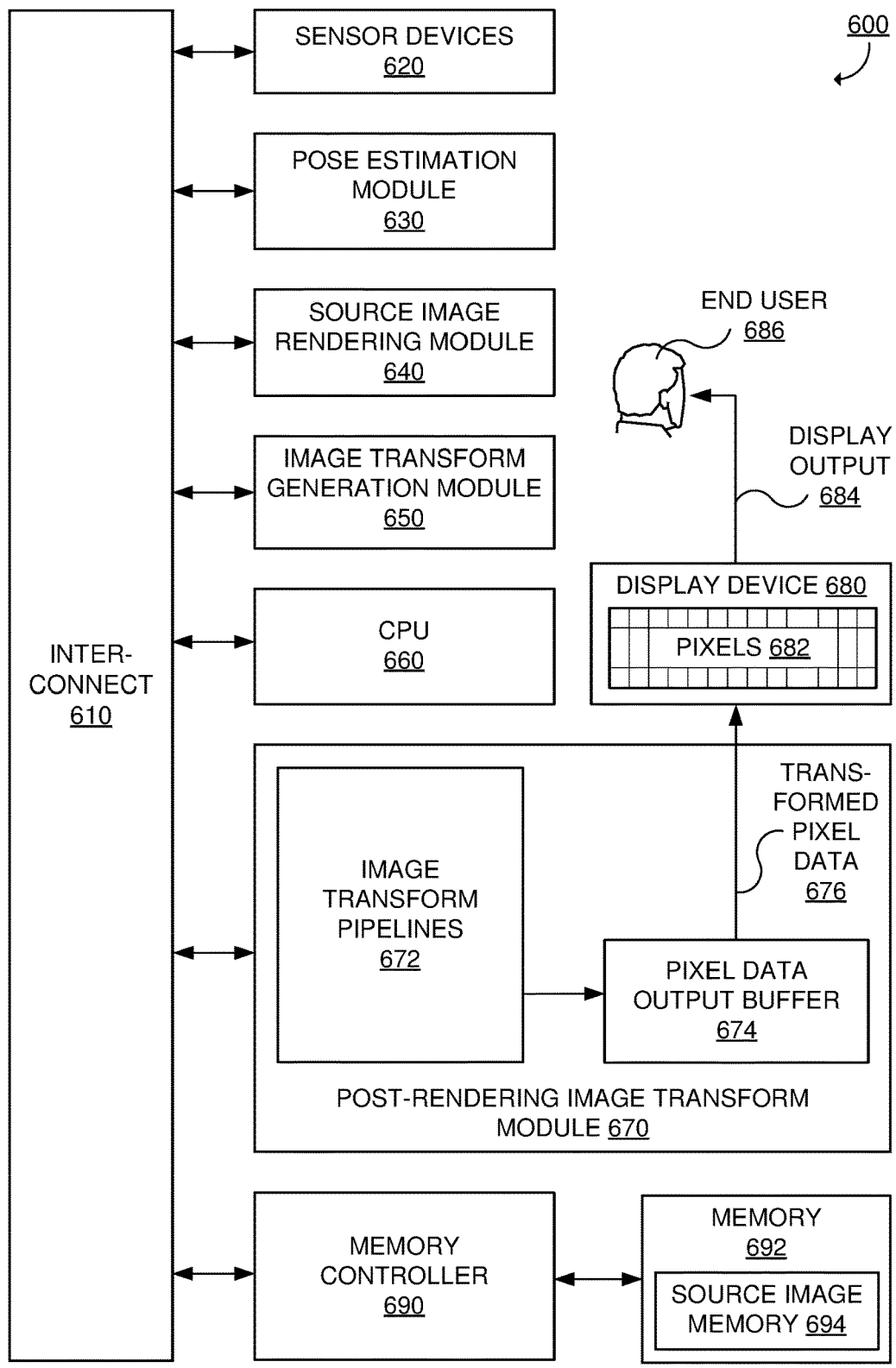
FIG. 6 is a schematic diagram illustrating features included in an example system arranged to reduce processing used for real-time late stage reprojection (LSR) of an initial rendered source image for display via a display device.

FIG. 6 is a schematic diagram illustrating features included in an example system 600 arranged to reduce processing used for real-time late stage reprojection (LSR) of an initial rendered source image for display via a display device having pixels 682. Except where conflicting with the below discussion, the descriptions in FIGS. 1-5 apply to system 600. Additionally, except where conflicting with the discussion of FIGS. 1-5, the descriptions in FIGS. 6-11 may be applied to system 100. System 600 may be considered an embodiment of system 100 illustrated in FIG. 1. LSR is particularly useful for immersive and/or interactive display technologies. For example, with a virtual reality (VR), augmented reality (AR), or mixed reality (MR) system using a head-mounted display (HMD) worn by an end user, most end users are sensitive to, and some users are hypersensitive to, even low amounts of latency between user movements (for example, head movements) and images displayed on an HMD. Additionally, in an AR system performing pass-through display of environmental images captured by a camera or an MR system using an optical see-through HIVID (including, but not limited to, an optical see-through HIVID worn by an end user) that allows direct viewing of a real-world environment (for example, via transparent lenses or a transparent panel) and projects images of a virtual object into the visual field of the end user thereby augmenting the real-world environment perceived by the end user with the virtual object, LSR improves an end user experience by reducing latency and associated misregistration between a displayed virtual object and the real-world environment. In addition to systems including HMDs, there are other immersive display techniques and applications (for example, a video game console that generates and displays images based on predicted poses for an end user based on sensor devices not located on an end user's body) for which LSR provides an improved user experience. LSR also provides an approach to generating images with low latency with respect to input on mobile devices and/or in low power applications, as it allows a source image to be rendered at a low frame rate based on a complex three-dimensional model and one or more reprojections of the rendered source image based on more recently predicted poses without another full rerendering of the model. Examples of LSR are described in U.S. Pat. No. 9,514,571, entitled "Late Stage Reprojection" and issued on Dec. 6, 2016, which is incorporated by reference herein in its entirety.

The system 600 includes an interconnect 610 that includes circuitry arranged to convey data and/or signals between and/or among various elements of the system 600, including, but not limited to, sensor devices 620, pose estimation module 630, source image rendering module 640, image transformation assignment module 650, CPU 660, LSR image transformation module 670, memory controller 690, and/or memory 692. Interconnect 610 may include topologies such as, but not limited to, buses, rings, meshes, point-to-point, or network-on-chip (NoC). Although FIG. 6 illustrates a single interconnect 610, some implementations include multiple such interconnects providing communication between various elements of system 600. For example, various serial bus protocols, such as but not limited to $I^2C$ (Inter-Integrated Circuit), SMBus (System Management Bus), and/or 1-Wire, may be used between pose estimation module 630 and one or more of the sensor devices 620.

System 600 includes sensor devices 620 arranged to collect and provide sensor data such as, but not limited to orientation data (for example, via one or more gyroscopes), movement and/or motion data (for example, via one or more accelerometers), position data (for example, via a global positioning satellite signal receiver and/or beacon receivers), image data (for example, via one or more cameras), environment depth data (for example, via one or more depth cameras and/or ultrasonic ranging devices), audio data (for example, via one or more microphones and related audio signal input devices), and/or eye-tracking data (for example, via an infrared eye tracking camera). For an implementation including an HMD, most or all of the sensor devices 620 (for example, most or all of the sensor devices 620 providing sensor data used by pose estimation module 630) may be included in or physically coupled to a head-mounted device and also referred to as a "head-mounted sensors." Sensor data collected via such head-mounted sensors reflect the position and orientations of a user's head.

Pose estimation module 630 is arranged to receive sensor data provided over time by sensor devices 620 and generate a predicted pose of an end user of system 600 based on the received sensor data for a specified time in the near future for an end user of the system 600 based on the received sensor data. Pose estimation module 915 may receive preprocessed sensor data from other elements included in system 600; for example, filtering, integration, and/or correlation of raw sensor data may be performed to generate preprocessed sensor data. A predicted pose may indicate, for example, a position, an orientation (for example, a gaze direction), and/or movement data (for example, movement data effective for applying motion blur).

Except where conflicting with the below discussion, the descriptions in FIGS. 1-5 of various implementations and examples of source image rendering module 105, source image memory 110, post-rendering transformation module 130, transformed pixel data 170, and display device 180 apply to their counterparts source image rendering module 640 (with source image rendering module 640 arranged to render source image data based on a predicted pose generated by pose estimation module 630 and, in some examples, store the rendered source image data in memory 692), source image memory 694, post-rendering transformation module 670, transformed pixel data 676, and display device 680. Except where conflicting with the below discussion, the descriptions in FIGS. 1-5 of various implementations and examples of source image memory 110, rendered source image data 112, and color component separated source image data 114 apply to storage, retrieval, and related processing of source images rendered by the source image rendering module 640 (with source image data being stored in, and retrieved from, a source image memory 694 portion of memory 692 via memory controller 690).

System 600 includes CPU 660, which is configured to execute program instructions causing CPU 660 to configure, coordinate, and/or control operation of other elements included in system 600. CPU 660 may be referred to as a "processor" or "processing unit." In some implementations, some or all of the operations of pose estimation module 630, source image rendering module 640, and/or image transformation generation module 650 may be implemented in part by CPU 660. In some implementations, some of the operations of a color component separation preprocessing module, an image transformation assignment module (e.g., image transform pipelines 672) and/or an output pixel assignment module (e.g., pixel data output buffer 674) included in post-rendering image transformation module 670 (such as the operations described for counterpart elements 120, 155, and 160 of post-rendering image transformation module 130) may be implemented in part by CPU 660. System 600 includes one or more machine readable media including instructions and/or data therein which, when processed and/or executed by elements of system 600, cause those elements and/or system 600 to perform various operations described herein; for example, CPU 660 may execute according to instructions stored in a nonvolatile storage device (not illustrated in FIG. 6). CPU 660 may include one or more processing cores adapted to execute respective instruction streams. CPU 660 may execute program instructions to perform other operations, such as, but not limited to, operating system functions and/or application programs. System 600 may additionally include other control logic (not illustrated in FIG. 6) which is arranged to coordinate and control operations of various elements included in system 600.

In some implementations, post-rendering transformation module 670 is implemented within a single SoC. In such implementations, pose estimation module 630, image transformation generation module 650, CPU 660, and memory controller 690 may also be implemented within the single SoC, and source image rendering module 640 and/or memory 692 may also be implemented within the single SoC. In some implementations, the elements illustrated in FIG. 6, with or without display device 680, may be included in a single electronic or mobile electronic device. In some implementations, the elements illustrated in FIG. 6 may be included in a single head-mounted mobile electronic device. In some implementations, display device 680 includes an optical see-through display through with a user may concurrently view a real-world environment through the display device along with transformed pixel data 676 physically displayed via the optical see-through display.

In some implementations, system 600 includes a memory controller 690 arranged to control and/or schedule accesses to memory 692 requested by various elements of system 600, thereby allowing those elements to share use of memory 692. Additional memory devices (not illustrated in FIG. 6), such as, but not limited to, flash memory or other nonvolatile memory devices, may also be accessed and shared via memory controller 690. Memory controller 690 includes circuitry specific to interoperating with the memory 692 to allow various elements of system 600 to store and/or retrieve data stored in memory 692 at selected or specified addresses. Examples of memory controllers are described in U.S. Patent Application Publication No. 2015/0293709, entitled "Fine-Grained Bandwidth Provisioning in a Memory Controller" and published on Oct. 15, 2015, which is incorporated by reference herein in its entirety. In some implementations, the memory controller 690 may be incorporated into the interconnect 610. In some implementations, a portion of the operations described in connection with source image data retrieval module 150 may be performed by the interconnect 610 and/or memory controller 690. Memory 692 is arranged to receive and store data responsive to received memory write commands and corresponding write data. Memory 692 is further arranged to receive memory read commands, for example, a memory read command specifying an address and an optional length and output corresponding data stored in the memory 692.

In some implementations, system 600 may be arranged to perform post-rendering transformation for two or more display devices or display regions; for example, generating multiple transformed images that are concurrently displayed on the multiple displays or display regions. For example, in some implementations including a stereoscopic display, two separate display devices or two display regions of one display device are provided, one for the left eye and the other for the right eye. Different images are displayed to each eye, providing a stereoscopic view of virtual objects. For a first display or display region, first source image data is rendered accounting for a viewpoint associated with the first display or display region (for example, a location and/or gaze direction for a left eye), and for a second display or display region, a different second source image data is rendered accounting for a viewpoint associated with the second display or display region (for example, a location and/or gaze direction for a right eye). In some implementations, system 600 includes separate post-rendering image transformation modules, for each of the displays or display regions, with other elements being shared, such as, but not limited to, sensors 620, pose estimation module 630, source image rendering module 640, image transformation generation module 650, CPU 660, memory controller 690, and/or memory 692. In some implementations, system 600 uses a single post-rendering image transformation module 670 for the above multiple displays or display regions. Various approaches may be used for sharing the single post-rendering image transformation module 670. In some implementations, the post-rendering image transformation module 670 is arranged to serially generate transformed images for one display or display region at a time. In some implementations, the post-rendering image transformation module 670 is arranged to interleave generating transformed images, such as by proceeding to a next display after generating a subportion of a transformed image (such as one or more scanlines or tiles); for such implementations. Similar adaptations may be applied to system 100.

The arrangement and interconnections among elements illustrated in FIG. 6 is merely illustrated as an example. It is understood that this disclosure also relates to other arrangements and interconnections among such elements that may be used to similar effect. Further details, implementations, and various implementations of system 600 are described below in FIGS. 7-11.

Figure 7:
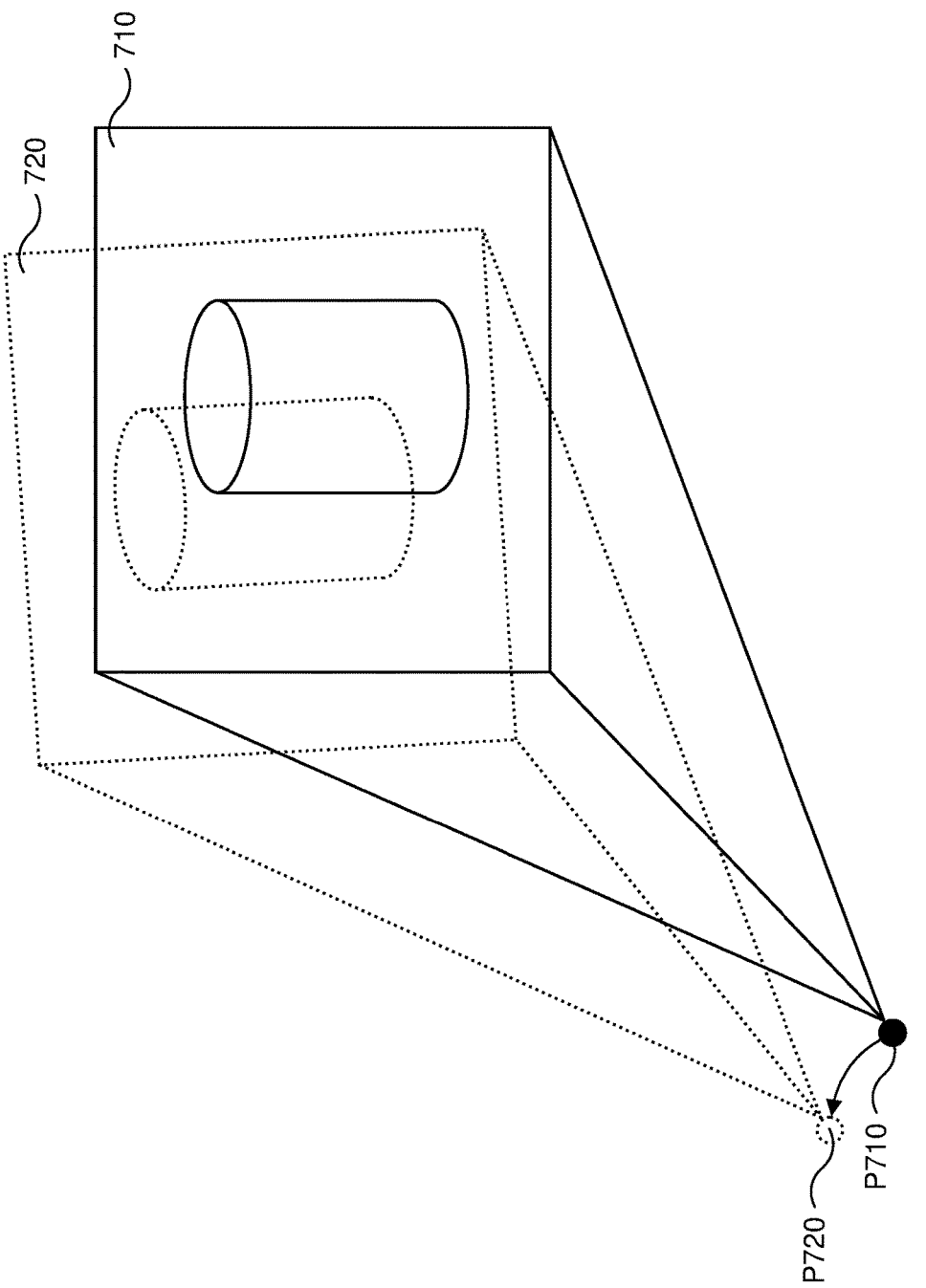
FIGS. 7 and 8 illustrate an example of the system illustrated in FIG. 6 operating in a configuration that concurrently generates transformed pixel color data for multiple color components, similar to the example illustrated in FIG. 4.

FIGS. 7 and 8 illustrate an example of the system 600 illustrated in FIG. 6 operating in a configuration that concurrently generates transformed pixel color data for multiple color components, similar to the example illustrated in FIG. 4. Except where conflicting with the below discussion, the descriptions in FIGS. 1, 2A, 3B, 4, and 6 apply to the configuration illustrated in FIGS. 7 and 8. In this example, LSR is used to generate a transformed image 720 corresponding to an updated predicted pose P720 by transforming a previously rendered initial source image 710 rendered based on an initial predicted pose P710. The operations illustrated in FIGS. 7 and 8 occur over a series of four successive frame times 810, 812, 814, and 816, each corresponding to output of a new transformed image by display device 680.

During frame time 810, pose estimation module 630 generates the initial predicted pose P710 for the end user 686 based on first sensor data provided by sensor devices 620. As noted previously, some or all of the sensor devices 620 may be head-mounted sensor devices included in a head-mounted mobile electronic device. The initial predicted pose P710 is generated for a specified first time T830 in the near future; for example, an estimated or actual time during which transformed pixel data based on the rendered source image 710 is expected to be output by the display device 680. In this example, the specified first time T830 corresponds to the middle of frame time 814.

Based on at least the initial predicted pose P710, the source image rendering module 640 renders the initial source image 710. A field of view for the initial source image 710 may be larger than a field of view for display 680, and a portion or portions of the initial source image 710 are used to generate transformed pixel data 676 using post-rendering transformation module 670. Source image data for the initial source image 710 and/or pixel color data derived therefrom (such as, but not limited to, color component separated source image data), may be stored in memory 692. Rendering of the initial source image 710 is completed during frame time 812.

Typically, after initial source image 710 has been rendered based on the initial predicted pose P710 (which may take a significant amount of time, computation, and/or energy in view of real-time processing resources and deadlines), sensor devices 620 have provided additional second sensor data, which is used by pose estimation module 630 to generate an updated predicted pose P720 for a specified second time. In this example, the second time is at time T830 corresponding to frame time 814. The second selected time may be approximately the first selected time (thereby providing a refined, and likely more accurate, predicted pose based on the more recent second sensor data provided between predicted poses P710 and P720), and/or a time during which the transformed image 720 will be output by display device 680. Image transformation generation module 650 is configured to dynamically generate one or more image transformations, based on at least the updated predicted pose P720. The one or more image transformations generated by the image transformation generation module 650 may be dynamically generated based on at least a difference between the initial predicted pose P710 and the updated predicted pose P720. Additional inputs or factors may be used for dynamically generating the transformation; for example, a dynamic transformation may be generated based further on a pupil location relative to an optical surface. During an LSR operation L720, occurring around the end of the frame time 812 and completing before frame time 814, the image transformations generated based on the updated predicted pose P720 are applied by the image transformation pipelines 672 to generate transformed pixel data 676 for the transformed image 720 (corresponding to the updated predicted pose P720) from the initial source image 710, much as previously described. The transformed pixel data 676 generated by LSR operation L720 is provided to display device 680 so as to be output by display device 680 during frame time 814, including during the second time specified for the updated predicted pose P720. As a result of these operations, a latency between sensing a pose change (via sensor devices 620) and outputting an image accounting for the sensed pose change is significantly reduced (in this case, by the about the difference in times between generating predicted poses P710 and P720). This provides a substantial improvement in the end user experience.

Multiple transformed images may be generated from an initial source image rendered by the source image rendering module 640, as is illustrated in FIG. 8 for initial source image 710. In that example, a second initial predicted pose P820 is generated for a second source image 820. However, rendering of the second source image 820 is not completed in time to be transformed for display during frame time 816 (for example, there may be a real-time deadline corresponding to generating a pose estimate (for example, pose estimate P720') for an LSR operation or dynamically generating one or more image transformations based thereon). As a result, the initial source image 710 is used again to generate another transformed image 720', much as described above for transformed image 720. Sensor devices 620 provide additional third sensor data, which is used by pose estimation module 630 to generate a second updated predicted pose P720' for a specified third time T832. Image transformation generation module 650 dynamically generates one or more image transformations, based on at least the second updated predicted pose P720' (for example, based on at least a difference between the initial predicted pose P710 and the second updated predicted pose P720'). During an LSR operation L720', occurring around the end of the frame time 814 and completing before frame time 816, the image transformations generated based on the second updated predicted pose P720' are applied by the image transformation pipelines 672 to generate transformed pixel data 676 for a transformed image 720' (corresponding to the updated predicted pose P720') from the initial source image 710. This transformed pixel data 676 is provided to display device 680 so as to be output during frame time 816, including during the third time T832 specified for the second updated predicted pose P720'. As a result, although source image 820 is not available for frame time 816, a low-latency image accounting for a pose change sensed after generating predicted pose P720 is displayed to the end user 686. Although not illustrated in FIG. 8, this may be repeated for additional frame times. This approach allows source image data to be generated at a frame rate slower than a rate at which transformed images are displayed to an end user, allowing for high quality renderings to be displayed with reduced power demands.

Figure 9:
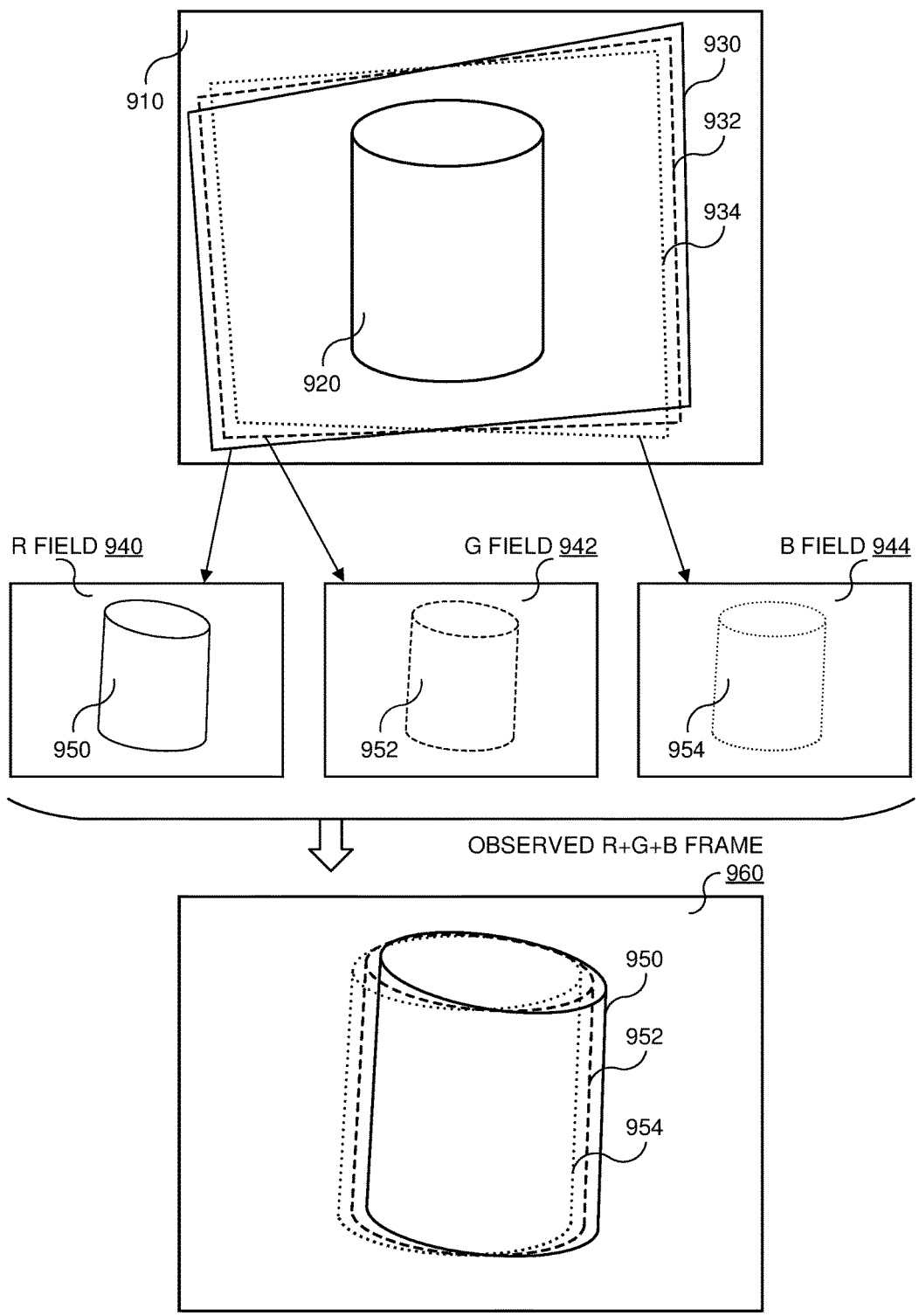
FIGS. 9 and 10 illustrate an example of the system illustrated in FIG. 6 operating in a configuration generating transformed pixel color data for a frame as a sequence of fields, each for a single color component, similar to the example in FIG. 5.

FIGS. 9 and 10 illustrate an example of the system 600 illustrated in FIG. 6 operating in a configuration generating transformed pixel color data for a frame as a sequence of fields, each for a single color component, similar to the example in FIG. 5. Except where conflicting with the below discussion, the descriptions in FIGS. 1, 2B, 2C, 3B, 5, and 6 apply to the configuration illustrated in FIGS. 9 and 10. Much as discussed for system 100 in FIGS. 1-5, in some implementations, the system 600 may be arranged to operate according to the configuration illustrated in FIGS. 7 and 8; in other implementations, the system 600 may be arranged to operate according to the configuration illustrated in FIGS. 9 and 10; and in other implementations, the system 600 may be arranged to selectively operate according to either of these two configurations.

In this example, LSR is used to generate a sequence of transformed fields 940, 952, and 954 corresponding to respective updated predicted poses P940, P942, and P944 by transforming a previously rendered initial source image 910 rendered based on an initial predicted pose P910. The operations illustrated in FIGS. 9 and 10 occur over a series of four successive frame times 1010, 1012, 1014, and 1016, each including a sequence of a plurality of field times; for example, frame time 1014 includes field time 1015r (displaying an R component, such as red), field time 1015g (displaying a G component, such as green), and a field time 1015b (displaying a B component, such as blue). Similarly, frame time 1016 includes field time 1017r (displaying an R component such as red), filed time 1017g (displaying a G component, such as green), and field time 1017b (displaying a B component, such as blue). For each field time new transformed pixel data is generated and then output using display device 680. For purposes of discussion, the timings of the renderings performed by the source image rendering module 640 are the same as those illustrated in FIG. 8. In much the same manner described for source image 710, source image rendering module 640 renders an initial source image 910 based on an initial predicted pose P910. Although FIG. 9 illustrates an example in which a time T1052 (around a middle of frame time 1014) is specified to generate first predicted initial predicted pose P910, in some examples a time earlier in frame time 1014, such as a time 1050 around the middle of field time 1015r, may be specified. The example initial source image 910 illustrated in FIG. 9 includes a rendering of a virtual object 920.

During field time 1013b at the end of frame time 1012, an LSR operation L940 is performed to transform R component pixel color values for the initial source image 910 to generate a transformed R component field 940 during field time 1015r. Although similar in many respects to the process used to generate transformed image 720 in FIGS. 7 and 8, there are some differences in how the transformed R component field 940 is generated. As only one component color, instead of multiple color components, is being processed during LSR operation L940, it has a significantly shorter duration than LSR operation L720. Consequently, a time between generating a first updated predicted pose P940 (based on first sensor data provided by sensor devices 620) and the beginning of frame time 1014 is significantly shorter a time between updated predicted pose P720 and the beginning of frame time 814 in FIG. 8. Also, whereas a selected time (T830) for generating updated predicted pose P720 corresponds to a frame time, a selected first time (T1050) for generating first updated predicted pose P940 corresponds to a field time. Where a specified time corresponds to a middle of a display period (a frame time in FIG. 8, and a field time in FIG. 10), this results in a substantial reduction in the difference between when an updated predicted pose is generated and its selected time. Additionally, whereas image transformation generation module 650 might generate different transformations for all color components for each LSR operation, in the configuration illustrated in FIGS. 9 and 10, image transformation generation module 650 would only do one color component, allowing a further reduction in a time between generating updated predicted pose P940 and the beginning of frame time 1014. FIG. 9 illustrates, as an example, a first perspective transformation 930 applied to generate transformed R component field 940. The transformed pixel data 676 generated by LSR operation L940 is provided to display device 680 so as to be output by display device 680 during field time 1015r.

In a similar manner, an LSR operation L942, occurring around an end of field time 1015r and completing before field time 1015g, generates a transformed G component field 942 by applying one or more G component image transformations dynamically generated based at least on a second updated predicted pose P942. The second updated predicted pose P942 is generated based on second sensor data provided by sensor devices 620 after the first sensor data used to generate first updated predicted pose P940, and as a result second updated predicted pose P942 may be different than first updated predicted pose P940. In such cases, the one or more image transformations generated by image transformation generation module 650 for LSR operation L942 based on the second updated predicted pose P942 may be different than if generated instead based on the first updated predicted P940. FIG. 9 illustrates, as an example, a second perspective transformation 932 applied to generate transformed G component field 942, which results in a G component transformation 952 of the virtual object 920 displayed during G component field time 1015g being different than the R component transformation 950 of the virtual object 920 displayed during R component field time 1015r. The transformed pixel data 676 generated by LSR operation L942 is provided to display device 680 so as to be output by display device 680 during field time 1015g.

In much the same manner, an LSR operation L942, occurring around an end of field time 1015g and completing before field time 1015b, generates a transformed B component field 944 by applying one or more B component image transformations dynamically generated based at least on a third updated predicted pose P944. The third updated predicted pose P944 is generated based on third sensor data provided by sensor devices 620 after the second sensor data used to generate second updated predicted pose P942. Based on the third updated predicted pose P944, image transformation generation module 650 generates one or more B component image transformations to be applied by LSR operation L944. FIG. 9 illustrates, as an example, a third perspective transformation 934 applied to generate transformed B component field 944, which results in a B component transformation 954 of the virtual object 920 displayed during B component field time 1015b. It is noted that the transformations 930, 932, and 934 are simplified image transformations (for example, an image transformation may involve multiple and/or more complex image transformations, including color-channel specific image transformations such as, but not limited to, correction of achromatic aberration) and their effects (such as differences between color component transformations 950, 952, and 954) are exaggerated for purposes of illustration and discussion. FIG. 9 illustrates, an observed frame 960 in which the transformed component fields 940, 942, and 944 presented in display output 684 during frame time 1014 have been temporally integrated. In some implementations, image transformations generated for each color component field may be based on sensed movement of end user 686 and/or an eye of end user 686 relative to display device 680. Such implementations may reduce "color breakup" without reducing displayed image quality or increasing a field display rate.

In much the same manner described for source image 820, source image rendering module 640 renders a source image 1020 based on an initial predicted pose P1020 (for a specified time T1054 around a middle of field time 1016). However, in contrast to the example illustrated in FIG. 8, although rendering of source image 1020 finishes by a same amount of time relative to frame time 1016 as rendering of source image 820 finishes before frame time 816, due to LSR operation L1040 involving updated predicted pose P1040 taking significantly less time than LSR operation L720', source image 1020 meets a real-time deadline for being transformed for display as a series of transformed color component fields 1040, 1042, and 1044 during frame time 1016. However, due to rendering of source image 1022 not completing by a similar real-time deadline for LSR operation L1040' involving updated predicted pose 1040' at the end of field time 1017b, source image 1020 is transformed again to generate display output 684 during the next frame time (not illustrated in FIG. 10), similar to the second transformation of source image 710 to generate transformed image 720' in FIG. 8.

In some examples, one or more color components may each be displayed multiple times within each frame time. For example, an "RGBG" FSC display device is configured to display, for each frame time, four fields: an R field, a first G field, a B field, and a second G field. In such examples, although the same pixel color data is retrieved for each of multiple field times within a frame time for a single color component (for example, G component source image data 116b would be used for the above-mentioned first and second G fields), different transformations may be applied for each of the multiple field times based on respective predicted poses (for example, a first predicted pose generated during the above-mentioned R field is used to transform the first G field, and a second predicted pose generated later during the B field is used to transform the second G field). As a result, each of the multiple times a single color component is displayed during a single frame time, it is transformed to account for the most recently available pose information.

As a variation of the approach illustrated in FIGS. 9 and 10, in some implementations new pose predictions are only generated for LSR operations once for each frame (for example, without generating pose estimates P942 and P944 for respective LSR operations L942 and L944), rather than for each field. P940 (which might instead have a specified time around the middle of frame time 1014, such as time T1052) would be used to generate one or more image transformations applied by LSR operations L940, L942, and L944. In such an example, the observed frame 960 would not demonstrate the differences between transformations 950, 952, and 954 of virtual object 920 illustrated in FIG. 9.

Figure 11:
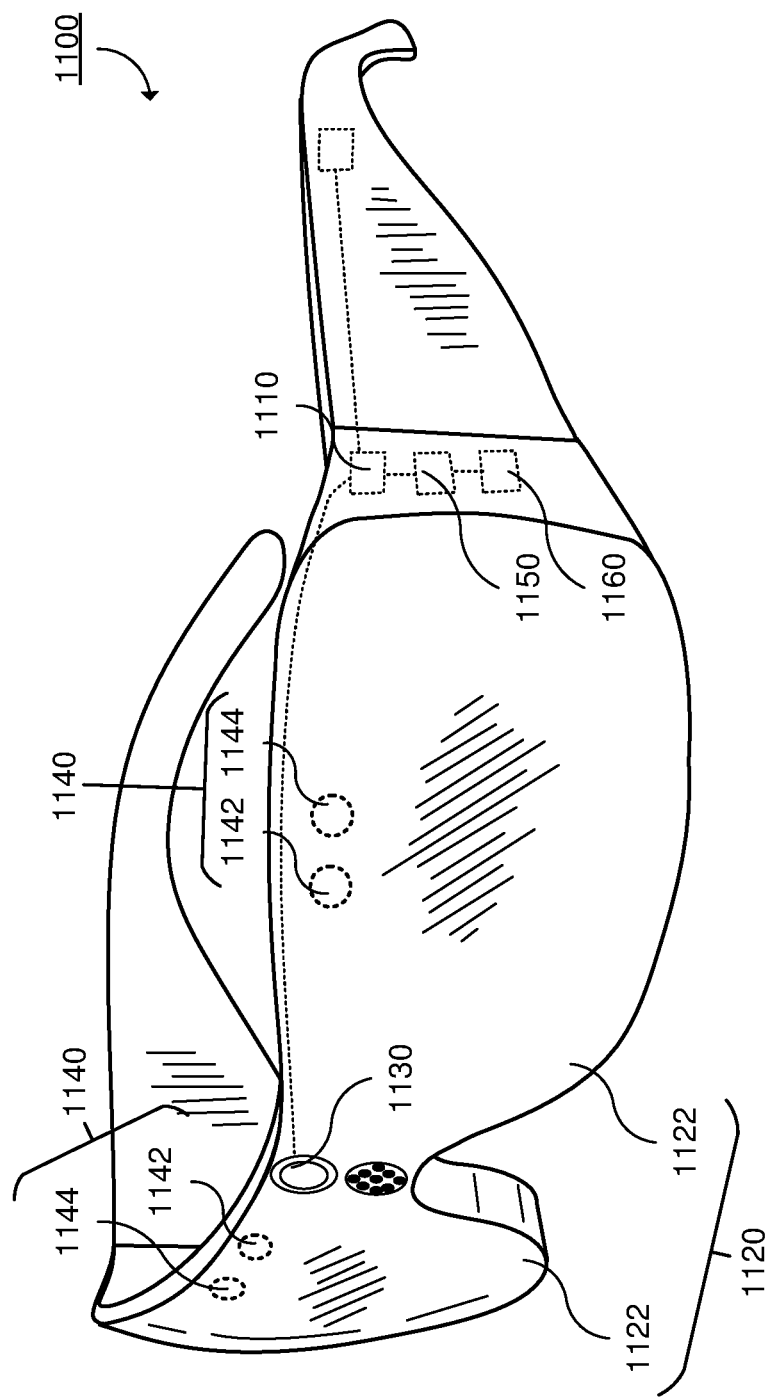
FIG. 11 illustrates an example of a mobile head-mounted device configured to incorporate the techniques described in FIGS. 1-10.

FIG. 11 illustrates an example of a mobile head-mounted device 1100 configured to incorporate the techniques described in FIGS. 1-10. The head-mounted device 1100 is intended to be worn on an end user's head during ordinary use. Except where conflicting with the below discussion, the descriptions in FIGS. 1-10 apply to the head-mounted device 1100. Except where conflicting with the below discussion, the descriptions in FIGS. 6-10 of various implementations and examples of sensor devices 620 apply to outward facing image sensors 1130, gaze detection subsystem 1140, location subsystem 1150, and motion sensor(s) 1160. Except where conflicting with the below discussion, the descriptions in FIGS. 6-10 of various implementations and examples of interconnect 610, pose estimation module 630, source image rendering module 640, image transformation generation module 650, CPU 660, post-rendering image transformation module 670, memory controller 690, and memory 692 apply to controller 1110. Except where conflicting with the below discussion, the descriptions in FIGS. 6-10 of various implementations and examples of display 680 apply to display subsystem 1120.

The head-mounted device 1100 includes a display subsystem 1120 for displaying images to an end user wearing the head-mounted device 1100. In the example illustrated in FIG. 11, the display subsystem 1120 is intended to be close to an end user's eyes. In some examples, the display subsystem 1120 includes a see-through HMD device including one or more transparent or semi-transparent see-through lenses 1122 arranged such that images may be projected onto the see-through lenses 1122, or produced by image-producing elements (for example, see-through OLED displays) located within the see-through lenses 1122. With see-through lenses 1122, an end user wearing the head-mounted device 1100 has an actual direct view of a real-world space (instead of image representations of the real-world space) through the see-through lenses 1122, and at the same time views virtual objects (which may be referred to as virtual images or holograms) that augment the user's direct view of the real-world space. It is noted that FIG. 11 is expressly not limited to use of see-through display devices. In some implementations, the display subsystem 1120 may be non-transparent and not allow, in all or part of an end user's field of view, the end user to directly view a surrounding environment through the display subsystem 1120. Such implementations include, but are not limited to, augmented reality devices arranged to display visual images of a physical space in front of the head-mounted device 1100 with virtual objects added to augment the display of the physical space, and virtual reality devices arranged to display virtual objects at positions corresponding to those of real-world objects in a physical space in front of the head-mounted device 1100. In some implementations, elements of head-mounted device 1100 may instead be embodied in a handheld mobile device arranged to display augmentations on a display device such as an LCD panel. In such implementations, the handheld mobile device may be arranged to provide a "window" in with virtual augmentations may be displayed for a scene around the head-mounted device 1100.

The head-mounted device 1100 further includes one or more outward facing image sensors 1130 configured to acquire image data for a real-world scene around and/or in front of the head-mounted device 1100. The outward facing image sensors 1130 may include one or more digital imaging cameras arranged to capture two-dimensional visual images. The outward facing imaging sensors 1130 may also include one or more depth cameras, such as, but not limited to, time of flight depth cameras, arranged to capture a depth image data, such as a depth map providing estimated and/or measured distances from the head-mounted device 1100 to various portions of a field of view (FOV) of the depth cameras.

The head-mounted device 1100 may further include a gaze detection subsystem 1140 configured to detect, or provide sensor data for detecting, a direction of gaze of each eye of an end user. The gaze detection subsystem 1140 may be arranged to determine gaze directions of each of a user's eyes in any suitable manner. For example, in the example illustrated in FIG. 11, the gaze detection subsystem 1140 includes one or more glint sources 1142, such as infrared light sources, arranged to cause a glint of light to reflect from each eyeball of an end user, and one or more image sensor(s) 1144 arranged to capture an image of each eyeball of the user. Changes in the glints from the user's eyeballs as determined from image data gathered via image sensor(s) 1144 may be used to determine a direction of gaze.

The head-mounted device 1100 may include a location subsystem 1150 arranged to provide a location of the head-mounted device 1100. Location subsystem 1150 may be arranged to determine a current location based on signals received from a navigation satellite system, such as, but not limited to, GPS (United States), GLONASS (Russia), Galileo (Europe), and CNSS (China), and technologies augmenting such signals, such as, but not limited to, augmented GPS (A-GPS). The location subsystem 1150 may be arranged to determine a location based on radio frequency (RF) signals identifying transmitting devices and locations determined for such devices. By way of example, Wi-Fi, Bluetooth, Zigbee, RFID, NFC, and cellular communications include device identifiers that may be used for location determination. Head-mounted device 1100 may be arranged to use a location provided by the location subsystem 1150 as an approximate location, which is refined based on data collected by other sensors.

The head-mounted device 1100 may include one or more motion sensor(s) 1160 arranged to measure and report motion of the head-mounted device 1100 as motion data. In some implementations, the motion sensor(s) 1160 may include an inertial measurement unit (IMU) including accelerometers (such as a 3-axis accelerometer), gyroscopes (such as a 3-axis gyroscope), and/or magnetometers (such as a 3-axis magnetometer). The head-mounted device 1100 may be arranged to use this motion data to determine changes in position and/or orientation of head-mounted device 1100 for use in pose estimation. The outward facing image sensor(s) 1130, image sensor(s) 1144, sensors included in the location subsystem 1150, motion sensor(s) 1160, which are included in or are coupled to the head-mounted device 1100, are head-mounted sensors.

The head-mounted device 1100 further includes a controller 1110 including a logic subsystem, a data holding subsystem, and a communications subsystem. The logic subsystem may include, for example, elements such as (or portions thereof) interconnect 610, pose estimation module 630, source image rendering module 640, image transformation generation module 650, CPU 660, post-rendering image transformation module 670, memory controller 690, and memory 692. The data holding subsystem may include, for example, elements such as (or portions thereof) interconnect 610, memory controller 690, and memory 692. The communications subsystem is arranged to allow the head-mounted device 1100 to communicate with other computer systems. Such communication may be performed via, for example, Wi-Fi, cellular data communications, and/or Bluetooth.

It will be appreciated that the head-mounted device 1100 is provided by way of example, and thus is not meant to be limiting. Therefore, it is to be understood that the head-mounted device 1100 may include additional and/or alternative sensors, cameras, microphones, input devices, output devices, etc. than those shown without departing from the scope of this disclosure. Further, the physical configuration of head-mounted device 1100 and its various sensors and subcomponents may take a variety of different forms without departing from the scope of this disclosure.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic device comprising:
   a post-rendering image transformation module including
      a plurality of image transformation pipelines each arranged to generate transformed pixel color data for a single color component by applying one or more two-dimensional (2D) image transformations to a rendered source image, the plurality of image transformation pipelines including first, second, and third image transformation pipelines;
   a source image data retrieval module arranged to retrieve pixel color values for the rendered source image in response to pixel color data requests received from the plurality of image transformation pipelines; and
   control logic arranged to operate in a first configuration in which the post-rendering image transformation module is configured to output a first image frame including a plurality of first pixels by sequentially generating and outputting a plurality of color component fields including a first color component field and a second color component field, wherein:

each of the plurality of first pixels has pixel color values for at least a first color component and a second color component different than the first color component, the first color component field includes first pixel color values for the first color component for the plurality of first pixels, the pixel color values included in the first color component field specify an intensity value for the first color component, the generating the first color component field includes generating a first portion of the first pixel color values by the first image transformation pipeline, a second portion of the first pixel color values by the second image transformation pipeline, and a third portion of the first pixel color values by the third image transformation pipeline, the second color component field includes second pixel color values for the second color component for the plurality of first pixels, the pixel color values included in the second color component field specify an intensity value for the second color component, the generating the second color component field includes generating a first portion of the second pixel color values by the first image transformation pipeline, a second portion of the second pixel color values by the second image transformation pipeline, and a third portion of the second pixel color values by the third image transformation pipeline, and the first image transformation pipeline, the second image transformation pipeline, and the third image transformation pipeline are different pipelines.

2. The electronic device according to claim 1, further comprising a field sequential color display device arranged to receive and display the plurality of color component fields in the sequence output by the post-rendering image transformation module.

3. The electronic device according to claim 2, further comprising:
a source image rendering module configured to render the source image from a three-dimensional model based on an initial predicted pose of an end user of the electronic device; and
an image transformation generation module configured to:
obtain an updated predicted pose of the end user, and
dynamically generate the one or more 2D image transformations based on at least the updated predicted pose.

4. The electronic device according to claim 3, further comprising:
a head-mounted display device;
one or more head-mounted sensor devices; and
a pose estimation module configured to:
receive first sensor data from the one or more head-mounted sensor devices,
generate the initial predicted pose based on at least the received first sensor data,
receive second sensor data from the one or more head-mounted sensor devices after receiving the first sensor data, and
generate the updated predicted pose based on at least the received second sensor data.

5. The electronic device according to claim 4, wherein:
the pose estimation module is further configured to:
receive third sensor data from the one or more head-mounted sensor devices after receiving the second sensor data, and
generate a second updated predicted pose based on at least the received third sensor data; and
the image transformation generation module is further configured to:
obtain the second updated predicted pose of the end user, and
dynamically re-generate the one or more 2D image transformations based on at least the second updated predicted pose for use in the generation of the second color component field.

6. The electronic device according to claim 1, wherein:
the control logic is further arranged to operate in a second configuration in which the post-rendering image transformation module is configured to output a second image frame by concurrently generating pixel color values for a third color component by the first image transformation pipeline, generating pixel color values for a fourth color component by the second image transformation pipeline, and generating pixel color values for a fifth color component by the third image transformation pipeline;
the control logic is further arranged to receive a display mode selection indicating a first display mode or a second display mode; and
the control logic is further arranged to selectively operate in the first configuration in response to the display mode selection indicating the first display mode and to operate in the second configuration in response to the display mode selection indicating the second display mode; and
the third, fourth, and fifth color components are different color components.

7. The electronic device according to claim 6, wherein:
in the first configuration, the device is configured to separate the rendered source image, storing pixel color values for the first color component for the rendered source image as a first component source image data and storing pixel color values for the second color component for the rendered source image as a second component source image data separate from the first component source image data; and
in the first configuration, the source image data retrieval module is configured to retrieve pixel color values for the first color component from the stored first component source image data and to retrieve pixel color values for the second color component from the stored second component source image data.

8. The electronic device according to claim 7, wherein in the second configuration, the source data retrieval module is configured to retrieve pixel color values for the first color component by obtaining pixel data words each encoding intensity values for the first and second color components, and to retrieve pixel color values for the second color component by obtaining pixel data words each encoding intensity values for the first and second color components.

9. The electronic device according to claim 8, wherein:
in the first configuration, the device is configured to store the first component source image data as first compressed image data encoding pixel color values for the first color component, and to store the second component source image data as second compressed image data separate from the first compressed image data and encoding pixel color values for the second color component;

in the second configuration, the device is configured to store the rendered source image as third compressed image data encoding pixel color values for the first and second color components; and in the second configuration, the source data retrieval module is configured to, in response to receiving a pixel color data request, retrieve a portion of the third compressed image data corresponding to the received pixel color data request, decompress the retrieved portion of the third compressed image data to obtain pixel data words each encoding intensity values for the first and second color components.

10. The electronic device according to claim 6, further comprising:

a source image rendering module configured to render the source image from a three-dimensional model based on an initial predicted pose of an end user of the electronic device; and an image transformation generation module configured to:

obtain an updated predicted pose of the end user, and dynamically generate the one or more 2D image transformations based on at least the updated predicted pose.

11. The device according to claim 10, further comprising:

a head-mounted display device;

one or more head-mounted sensor devices; and a pose estimation module configured to:

receive first sensor data from the one or more head-mounted sensor devices, generate the initial predicted pose based on at least the received first sensor data, receive second sensor data from the one or more head-mounted sensor devices after receiving the first sensor data, and generate the updated predicted pose based on at least the received second sensor data.

12. The device according to claim 6, wherein:

the plurality of color component fields consists of a first total number of color component fields;

the second image frame includes a plurality of second pixels, each of the second pixels having pixel color values for a second total number of color components; and the first total number is different than the second total number.

13. The device according to claim 6, further comprising a pixel data output buffer arranged to receive pixel color values generated by the first image transformation module, receive pixel color values generated by the second image transformation module, and receive pixel color values generated by the third image transformation module, wherein the control logic is arranged to, while operating in the first configuration, configure the pixel data output buffer to, for each of a plurality of pixels for the first color component field, arrange the pixel color values received by the pixel data output buffer from the first, second, and third image transformation modules according to the locations of their respective first pixels in the first image frame, and the control logic is arranged to, while operating in the second configuration, configure the pixel data output buffer to, for each of a second plurality of second pixels included in the second image frame, output a pixel data word including a pixel color value received by the pixel data output buffer from the first image transformation module, a second pixel color value received by the pixel data output buffer from the second image transformation module, and a pixel color value received by the pixel data output buffer from the third image transformation module.

14. The electronic device according to claim 1, wherein:

when the control logic is operating in the first configuration, the post-rendering image transformation module is configured to output the first pixel color values in rows or portions of rows;

the first portion of the first pixel color values comprises pixel color values for a first contiguous group of columns of the first pixels;

the second portion of the first pixel color values comprises pixel color values for a second contiguous group of columns of the first pixels that does not overlap the first contiguous group of columns; and the third portion of the first pixel color values comprises pixel color values for a third contiguous group of columns of the first pixels that does not overlap the first or second contiguous groups of columns.

15. The device according to claim 1, further comprising an image transformation assignment module configured to operate in a third configuration configured to:

configure the first image transformation pipeline to apply one or more first 2D image transformations to generate the first portion of the first pixel color values;

configure the second image transformation pipeline to apply one or more second 2D image transformations to generate the second portion of the first pixel color values;

configure the third image transformation pipeline to apply one or more third 2D image transformations to generate the third portion of the first pixel color values;

configure the first image transformation pipeline to apply one or more fourth 2D image transformations to generate the first portion of the second pixel color values, the fourth 2D image transformations being different than the first 2D image transformations;

configure the second image transformation pipeline to apply one or more fifth 2D image transformations to generate the second portion of the second pixel color values, the fifth 2D image transformations being different than the second 2D image transformations; and configure the third image transformation pipeline to apply one or more sixth 2D image transformations to generate the third portion of the second pixel color values, the sixth 2D image transformations being different than the third 2D image transformations.

16. A method for operating an electronic device for post-rendering image transformation, the method comprising:

determining, at the device, that a source image has been rendered, the rendered source image including a plurality of source pixels; and outputting, from the device, an image frame including a plurality of first pixels by sequentially generating and outputting a plurality of color component fields including a first color component field and a second color component field by applying one or more two-dimensional (2D) image transformations to at least one portion of the plurality of source pixels by first, second, and third image transformation pipelines, to generate, at the device, transformed pixel color data for the first color component field and the second color component field, wherein:

each of the plurality of first pixels has pixel color values for at least a first color component and a second color component different than the first color component, the first color component field includes first pixel color values for the first color component for the plurality of first pixels, the pixel color values included in the first color component field specify an intensity value for the first color component, the generating the transformed pixel color data for the first color component field includes generating a first portion of the first pixel color values by the first image transformation pipeline, a second portion of the first pixel color values by the second image transformation pipeline, and a third portion of the first pixel color values by the third image transformation pipeline, the second color component field includes second pixel color values for the second color component for the plurality of first pixels, the pixel color values included in the second color component field specify an intensity value for the second color component, the generating the transformed pixel color data for second color component field includes generating, at the device, a first portion of the second pixel color values by the first image transformation pipeline, a second portion of the second pixel color values by the second image transformation pipeline, and a third portion of the second pixel color values by the third image transformation pipeline, and the first image transformation pipeline, the second image transformation pipeline, and the third image transformation pipeline are different pipelines.

17. The method of claim 16, further comprising displaying via a field sequential color display device the plurality of color component fields in the outputted sequence.

18. The method of claim 16, further comprising:
obtaining an initial predicted pose for an end user;
rendering the source image from a three-dimensional model based on the initial predicted pose; and
obtaining an updated predicted pose for the end user; and
dynamically generating the one or more 2D image transformations based on at least the updated predicted pose.

19. The method of claim 18, further comprising:
receiving first sensor data from one or more head-mounted sensor devices;
generating the initial predicted pose based on at least the received first sensor data;
receiving second sensor data from the head-mounted sensor devices after receiving the first sensor data;
generating the updated predicted pose based on at least the received second sensor data; and
displaying via a head-mounted field sequential color display the plurality of color component fields in the outputted sequence.

20. The method of claim 19, further comprising:
receiving third sensor data from the one or more head-mounted sensor devices after receiving the second sensor data;
generating a second updated predicted pose based on at least the received third sensor data; and
dynamically re-generating the one or more 2D image transformations based on at least the second updated predicted pose for use in the generation of the second color component field.

* * * * *